(12) United States Patent
Uenishi

(10) Patent No.: US 10,162,248 B2
(45) Date of Patent: Dec. 25, 2018

(54) AUTOMATIC FOCUSING APPARATUS AND CONTROL METHOD THEREFOR

(71) Applicant: CANON KABUSHIKI KAISHA, Tokyo (JP)

(72) Inventor: Masaaki Uenishi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/074,958

(22) Filed: Mar. 18, 2016

(65) Prior Publication Data
US 2016/0205313 A1    Jul. 14, 2016

Related U.S. Application Data

(63) Continuation of application No. 14/276,808, filed on May 13, 2014, now abandoned, which is a continuation of application No. 12/560,212, filed on Sep. 15, 2009, now abandoned.

(30) Foreign Application Priority Data

Sep. 16, 2008 (JP) .................. 2008-237187

(51) Int. Cl.
*G03B 13/36* (2006.01)
*G03B 13/20* (2006.01)
*G02B 7/09* (2006.01)
*G02B 7/38* (2006.01)
*G02B 7/36* (2006.01)
*H04N 5/232* (2006.01)
*G02B 27/00* (2006.01)

(52) U.S. Cl.
CPC ............... *G03B 13/36* (2013.01); *G02B 7/09* (2013.01); *G02B 7/36* (2013.01); *G02B 7/38* (2013.01); *G03B 13/20* (2013.01); *H04N 5/23212* (2013.01); *G02B 27/0093* (2013.01)

(58) Field of Classification Search
CPC . G03B 3/00; G03B 3/10; G03B 13/18; G03B 13/20; G03B 13/32; G03B 13/34; G03B 13/36
USPC .......................................................... 396/104
See application file for complete search history.

(56) References Cited

U.S. PATENT DOCUMENTS

2007/0177862 A1* 8/2007 Terayama ............. G03B 13/34
                                                      396/133
2011/0044675 A1* 2/2011 Uenishi ................. G02B 7/102
                                                       396/95

* cited by examiner

*Primary Examiner* — Clayton E Laballe
*Assistant Examiner* — Fang-Chi Chang
(74) *Attorney, Agent, or Firm* — Canon U.S.A., Inc. IP Divison

(57) ABSTRACT

An automatic focusing apparatus detects presence or absence of change in a distance between an object and the automatic focusing apparatus while operating in an operation mode to continuously perform an adjustment of the position of a focus lens to focus on the object, and stops a movement of the focus lens if a change in the distance is not detected.

20 Claims, 17 Drawing Sheets

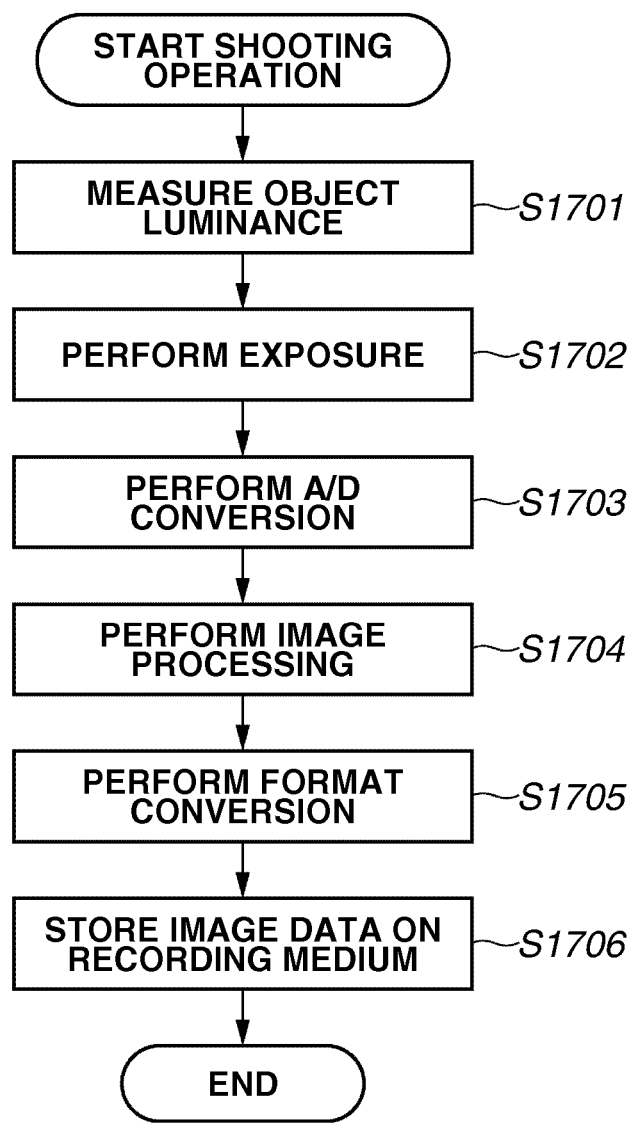

AUTOMATIC FOCUSING APPARATUS AND CONTROL METHOD THEREFOR

CROSS REFERENCE TO RELATED APPLICATIONS

This application is a Continuation of U.S. patent application Ser. No. 14/276,808 filed May 13, 2014, which is a Continuation of U.S. patent application Ser. No. 12/560,212 filed Sep. 15, 2009, which claims the benefit of Japanese Patent Application No. 2008-237187 filed Sep. 16, 2008, all of which are hereby incorporated by reference in their entirety.

BACKGROUND OF THE INVENTION

Field of the Invention

The present invention relates to an automatic focusing apparatus, e.g., a camera, and a control method therefor.

Description of the Related Art

Conventionally, an automatic focusing apparatus of an auto-focusing (AF) system which focuses on an object by moving a focus lens position according to a luminance signal obtained from an image sensor, such as a charge-coupled device (CCD), has been used in an electronic still camera or the like. In the automatic focusing apparatus, a focus evaluation value indicating a contrast within an AF area is calculated by integrating high-frequency components of a signal in the AF area set within an image plane. Then, a focus detection operation for acquiring a focus evaluation value for each position of a focus lens is performed by shifting the focus lens, to detect a position of the focus lens enabling the highest focus evaluation value, which is regarded as an in-focus point. Further, in an automatic focusing apparatus of the AF system, by repeatedly performing the focus detection operation, focusing can be also achieved on a moving object by tracking it.

As a technology relating to an automatic focusing apparatus which also enables focusing with respect to a moving object by tracking it, Japanese Patent Application Laid-Open No. 2004-212556, and Japanese Patent Application Laid-Open No. 2007-206433 are known. Japanese Patent Application Laid-Open No. 2004-212556 discusses an imaging apparatus equipped with an automatic focusing apparatus which causes an AF tracking to an object to be performed by repeating a focus detection operation by a lens movement before shooting. Further, Japanese Patent Application Laid-Open No. 2007-206433 discusses a technology for storing in advance in-focus positions after having performed the focus detection operation for each shooting, in a continuous shooting or the like, predicting an in-focus position before a next shooting based on the previous in-focus positions previously stored, thus determining a range for a focus detection operation.

However, in the above-described conventional technology, even in a case where a distance between an automatic focusing apparatus and an object has not changed, e.g., the object comes to rest, a focus detection operation is continuously performed so that the focus lens is sequentially moved. For this reason, a focus fluctuation always occurs, and a tracking ability to the object may deteriorate. In particular, in an electronic viewfinder (EVF) display using consecutive captured images, or the like, frames which are out-of focus may be generated, and accordingly visual quality may degrade. Further, the focus lens is sequentially moved, thus leading to an increase in battery consumption.

SUMMARY OF THE INVENTION

The present invention is directed to an automatic focusing apparatus capable of preventing tracking ability to an object from deteriorating, even if a distance between the automatic focusing apparatus and the object does not change, when continuously performing an adjustment of position of a focus lens to make focus on an object, and to a control method therefor.

According to an aspect of the present invention, an automatic focusing apparatus includes an imaging unit configured to capture an object image that is input via a focus lens to output image data, a detection unit configured to detect a focus signal that indicates a focusing state of the focus lens based on the image data, a focus adjustment unit configured to adjust a position of the focus lens based on the focus signal detected by the detection unit, a control unit configured to cause the focus adjustment unit to operate in an operation mode to continuously perform an adjustment of the position of the focus lens, and a distance change detection unit configured to detect, when the focus adjustment unit is operating in the operation mode, presence or absence of change in a distance between the object and the automatic focusing apparatus, wherein the control unit stops the adjustment of the position of the focus lens if a change in the distance is not detected by the distance change detection unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 17 is a flowchart illustrating a subroutine of a shooting operation.

DESCRIPTION OF THE EMBODIMENTS

Various exemplary embodiments, features, and aspects of the invention will be described in detail below with reference to the drawings.

Figure 1:
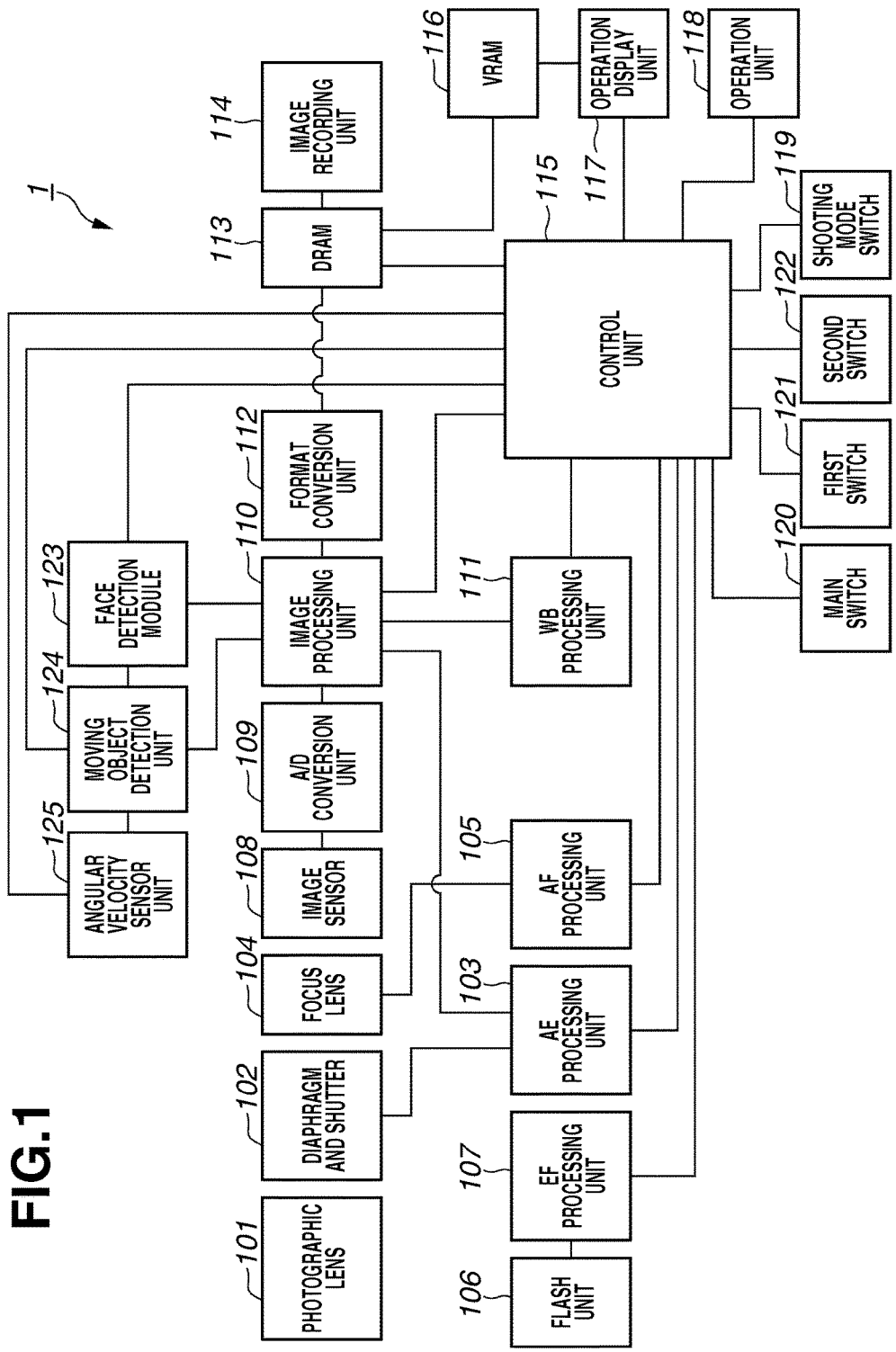
FIG. 1 is a block diagram illustrating a configuration of an imaging apparatus according to an exemplary embodiment of the present invention.

FIG. 1 is a block diagram illustrating a configuration of an imaging apparatus 1 according to an exemplary embodiment of the present invention. As illustrated in FIG. 1, the imaging apparatus 1 is an electronic still camera, which captures an image by an image sensor 108, the image being formed via a photographic optical system including a photographic lens 101, a diaphragm and shutter 102, and a focus lens 104. Further, the imaging apparatus 1 includes an AF processing unit 105, which moves the focus lens 104 under the control of a control unit 115, and is configured to perform focus adjustment by moving the focus lens 104 according to image data captured by the image sensor 108.

The photographic lens 101 is an optical lens including a zoom mechanism and so on. The diaphragm and shutter 102 controls a light amount from an object according to control of an AE processing unit 103 (AE: automatic exposure). The AE processing unit 103 controls an aperture value and a shutter speed of the diaphragm and shutter 102 under the control of the control unit 115. The focus lens 104 is moved along an optical axis by an actuator (not illustrated), which moves in response to control of the AF processing unit 105. Thereby, the focus lens 104 performs focus adjustment of an image obtained in the image sensor 108. The AF processing unit 105 controls a movement of the focus lens 104 under the control of the control unit 115 (the details will be described below). Therefore, reflected light from the object enters the photographic lens 101 and subsequently an amount of exposure is adjusted via the diaphragm and shutter 102, and an image is formed by the focus lens 104 and captured by the image sensor 108.

A flash unit 106 emits auxiliary light to the object in response to the control of an EF processing unit 107 (EF: pre-flash). The EF processing unit 107 controls a light emission of the flash unit 106 under the control of the control unit 115. For example, the EF processing unit 107 causes the flash unit 106 to perform a preliminary light emission, before a main shooting by the image sensor 108 performed under the control of the control unit 115, and detects an amount of reflected light from the object by a sensor (not illustrated), and calculates an amount of light emission during a main flash. Subsequently, the EF processing unit 107 causes the flash unit 106 to execute a light emission with calculated amount of light emission, at the time of the main shooting, thereby subjecting the object to a correct exposure.

The image sensor 108 outputs an image formed by the focus lens 104 as image data converted into an electrical analog signal by photoelectric conversion. More specifically, the image sensor 108 is typically a charge-coupled device (CCD) or a complementary metal-oxide semiconductor (CMOS) sensor or the like. An analog-to-digital (A/D) conversion unit 109 converts analog image data, which is output from the image sensor 108, into digital image data. Alternatively, the A/D conversion unit 109 may be configured to include a correlated double sampling (CDS) circuit, which eliminates an output noise of the image sensor 108, and a nonlinear amplifier circuit operable before A/D conversion.

An image processing unit 110 performs various image processes on digital image data output from the A/D conversion unit 109, and outputs processed digital image data. A white balance (WB) processing unit 111 performs white balance processing on image-processed digital image data output from the processing unit 110. A format conversion unit 112 converts a data format of the image-processed digital image data output from the image processing unit 110 into a predetermined image format such as a Joint Photographic Experts Group (JPEG).

A dynamic random access memory (DRAM) 113 temporarily stores image data converted into a predetermined image format by the format conversion unit 112. Further, the DRAM 113 may be used as a work area for the control unit 115 and a work area for compression/decompression of the image data. An image recording unit 114 includes a recording medium, such as a memory card, and an interface of the recording medium (either of them not illustrated). The image recording unit 114 records digital image data captured by the image sensor 108, under the control of the control unit 115 and temporarily stored in the DRAM 113, in the recording medium. Alternatively, the recording medium of the image recording unit 114 may be attached to or detached from the imaging apparatus 1 via the interface.

The control unit 115 conducts central control of operations of respective units of the imaging apparatus 1. More specifically, the control unit 115 includes a central processing unit (CPU), a read-only memory (ROM), and so forth. The control unit 115 implements the above-described central control by causing the CPU to read out program data stored in the ROM, to load the program data onto the work area of the image recording unit 114, and to execute in sequence the program data. For example, the control unit 115 controls system processing such as a shooting sequence by the image sensor 108 according to an operation mode set by an operation unit 118 and a shooting mode switch (SW) 119.

A video RAM (VRAM) 116 temporarily stores image data output from the control unit 115 for use in a display of an operation display unit 117. The operation display unit 117 is a display device, such as a liquid crystal display (LCD) or the like, which displays an image under the control of the control unit 115. The operation display unit 117 performs a display for operational support and a state display of the imaging apparatus 1, as well as displays of a shooting image plane by an EVF during shooting process and an AF area set in advance in the shooting image plane.

The operation unit 118 includes buttons for receiving an operation instruction from a user and outputting an operation signal to the control unit 115, and a touch panel arranged on a screen of the operation display unit 117, and others. More specifically, the operation unit 118 includes a menu switch operable to perform various types of settings, e.g., a setting of a shooting function of the imaging apparatus 1 and a setting during an image reproduction, a zoom lever operable to instruct a zooming operation of the photographic lens 101, and the operation mode changeover switch operable to switch a shooting mode and a reproduction mode. The shooting mode SW 119 is a switch operable to receive a changeover instruction of the shooting mode of the imaging apparatus 1 from the user and to output it to the control unit 115. For example, the shooting mode SW 119 receives from the user the changeover instruction of ON or OFF of a face detection mode for performing face detection from the captured image. Further, the shooting mode SW 119 may receive a changeover instruction of the AF mode from the user.

A main switch 120 is a switch operable to receive a power ON/OFF instruction from the user and to output it to the control unit 115. A first switch 121 is a switch operable to receive from the user a start instruction of a shooting standby operation such as starting the AF processing and AE processing in advance, and to output the start instruction to the control unit 115. A second switch 122 is a switch operable to receive from the user the start instruction of shooting after the operation of the first switch 121 and to output the start instruction to the control unit 115. Alternatively, the first switch 121 and the second switch 122 may be configured such that the first switch 121 is turned ON by a half press of a shutter button (not illustrated), and the second switch 122 is turned ON by a full press of the shutter button.

A face detection module 123 detects a face region of a person from image-processed digital image data output from the image processing unit 110, and outputs one or a plurality of pieces of face information (position of face region, its size, reliability, etc.) which have been detected to the control unit 115. Publicly known technologies can be applied to a method for detecting a face of a person, and it has not a direct relationship with the present invention, and thus detailed description will be omitted.

In addition, publicly known face detection technologies include a technique based on a learning which utilizes a neural network, for example, a method for searching for areas which are characteristic of shapes of eyes, nose, mouth, etc., using a template matching from an image, and regarding it as a face if similarity is high, and others. Further, besides, a technique for detecting image feature quantity such as color of skin and shape of eyes using a statistical analysis, and a number of other techniques are discussed. Generally, accuracy of the face detection is enhanced by combining a plurality of these techniques. A specific example includes a method for face detection utilizing a wavelet conversion and an image feature quantity, as discussed in Japanese Patent Application Laid-Open No. 2002-251380.

A moving object detection unit 124 compares a plurality of captured images which have been continuously captured by the image sensor 108 with each other, and detects whether an object and background are moving, and outputs information about the moving object to the control unit 115. More specifically, the moving object detection unit 124 compares two frames of the captured images which are aligned side by side in time sequence, out of image-processed digital image data output from the image processing unit 110, and detects moving object information (amount of movement, position, range) of the object and the background from the difference information, and outputs it to the control unit 115.

An angular velocity sensor unit 125 detects a movement (angular velocity) of the imaging apparatus 1 itself and outputs movement information (amount of movement) thereof to the control unit 115. More specifically, the angular velocity sensor unit 125 may be typically a gravity sensor or a gyro sensor, which detects a position of sphere within a circular cavity and detects an orientation of the imaging apparatus 1 relative to the vertical direction.

Figure 2:
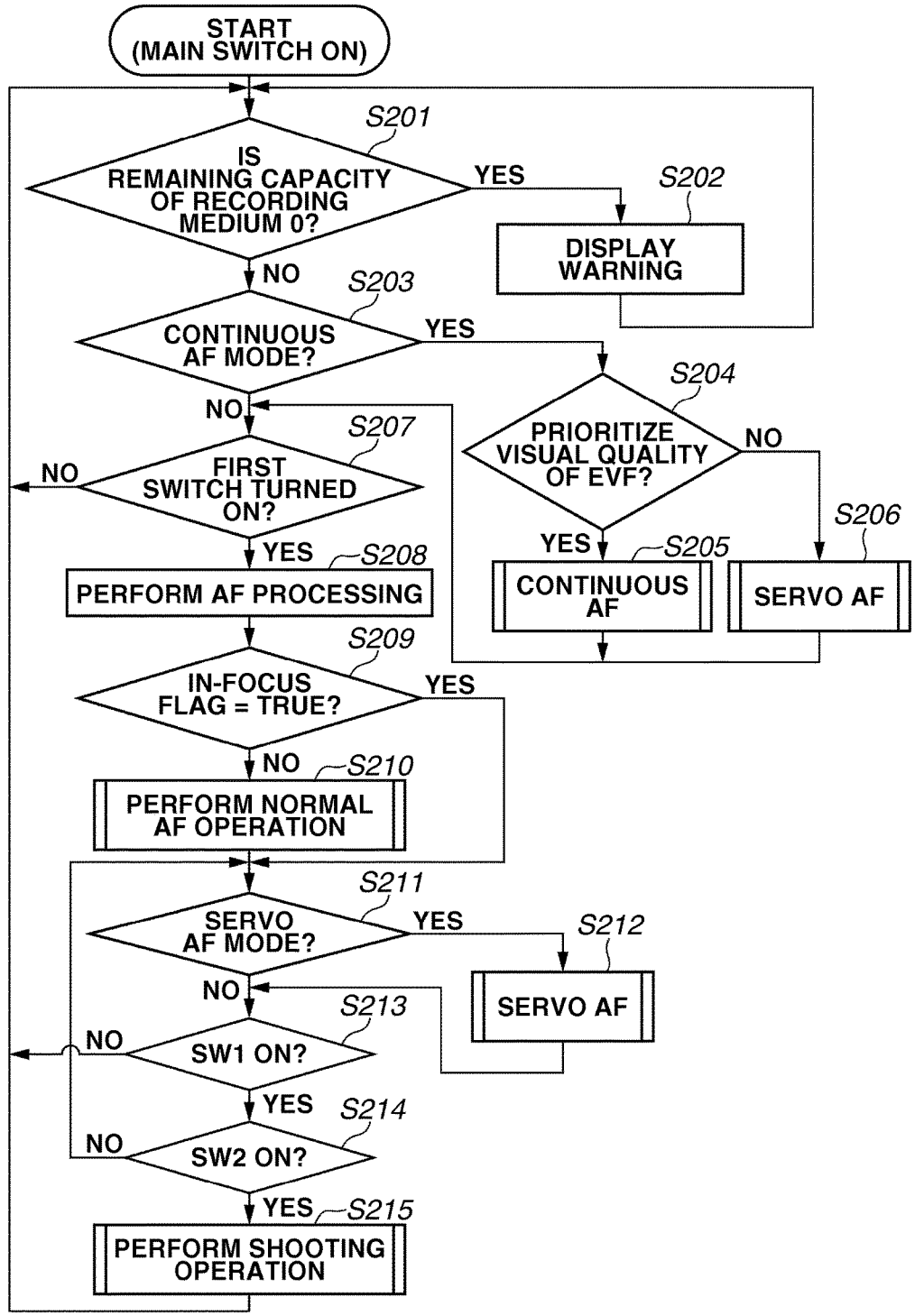
FIG. 2 is a flowchart illustrating an operation of the imaging apparatus.

Next, an operation of the imaging apparatus 1 performed under the control of the control unit 115 will be described below with reference to FIG. 2 to FIG. 17. FIG. 2 is a flowchart illustrating an operation of the imaging apparatus 1. The control unit 115 stores variables information for operation in the work area of the DRAM 113, in a flowchart illustrated below, and executes processing while reading out and updating the variables information in each step. The variables information stored in the work area of the DRAM 113 includes flag data and numerical data such as calculated values and counter values.

The flag data includes an in-focus flag, a peak detection flag, a distance change flag, a same direction movement flag, a face detection flag, and others. The in-focus flag is flag data that indicates a determined result in an in-focus determination. If the in-focus flag is TRUE, it denotes that focus is achieved on an object, and if FALSE, it indicates that focus is not achieved on the object. The face detection flag is flag data that indicates whether a face is detected in the face detection module 123. If the face detection flag is TRUE, it indicates that a face is detected, and if FALSE, it indicates that the face is not detected. A peak detection flag is flag data that indicates that a peak where a focus evaluation value becomes maximal in a hill-climbing AF operation (focus detection operation) is detected. If the peak detection flag is TRUE, it indicates that the peak is detected, and if FALSE, it indicates that the peak is not detected. A distance change flag is flag data that indicates that an object distance between the imaging apparatus 1 and the object is changed. If the distance change flag is TRUE, it indicates that the object distance has changed, and if FALSE, it indicates that the object distance has not changed. A same direction movement flag is flag data that indicates whether a direction of a peak position relative to a scan center position in a current focus detection operation is the same as a direction of a peak position relative to a scan center position in the previous focus detection operation. If the same direction movement flag is TRUE, it indicates they are the same directions, and if FALSE, it indicates that they are not the same directions.

Further, numerical data includes a focus evaluation value described above, an acquisition counter, an increase counter, number of times of detected-face size change, number of times of luminance value change, number of times of focus evaluation value change, number of times of camera operation, number of times of object operation, xcount value, and StCount value. The acquisition counter is numerical data that indicates the number of times that the current position of the focus lens 104 has been acquired. The increase counter is numerical data that indicates that a focus evaluation value acquired in the nearest preceding processing, in the hill-climbing AF, is larger than a focus evaluation value acquired in the preceding processing (the number of times). The number of times of detected-face size change is numerical data that indicates the number of times that a size of face detected by the face detection module 123 in an image area of AF frame has changed. The number of times of luminance value change is numerical data that indicates the number of times that the luminance value has changed in the image area of the AF frame. The number of times of focus evaluation values change is numerical data that indicates the number of times that the focus evaluation value has changed in the image area of the AF frame. The number of times of camera operation is numerical data that indicates the number of times that the operation amount (amount of movement) of the imaging apparatus 1 has changed by an amount equal to or greater than a predetermined value set in advance. The number of times of object operation change is numerical data that indicates the number of times that an operation amount of an object has changed by an amount equal to or greater than a set in advance predetermined value. The ×count value is numerical data that indicates the number of times that in-focus determinations are not "○" determinations consecutively (number of times of "×" determinations). The StCount value is numerical data that indicates the number of times that differences between peak positions and scan center positions become consecutively smaller than a predetermined value.

As illustrated in FIG. 2, the imaging apparatus 1 starts processing under the control of the control unit 115 by turning the main switch 120 ON so as to turn the power on. If the processing is started, then in step S201, the control unit 115 checks a remaining capacity of the recording medium in the image recording unit 114. If the remaining capacity is 0 (YES in step S201), then the processing proceeds to step S202. If the remaining capacity is not 0 (NO in step S201), then the processing proceeds to step S203. In step S201, in advance of a detection of the remaining capacity, the control unit 115 may detect whether the recording medium exists in the image recording unit 114. If the recording medium is not connected thereto, the processing may proceed to step S201.

If the remaining capacity of the storage medium of the image recording unit 114 is 0, the control unit 115 displays a warning that the remaining capacity of the image recording unit 114 is 0 to the operation display unit 117 in step S202, and then the processing returns to step S201. Alternatively, in step S202, the control unit 115 may output a warning sound from an audio output unit (not illustrated) constituted by an amplifier and speaker, or may perform the both of warning display by the operation display unit 117 and an output of the warning sound by the audio output unit.

In step S203, the control unit 115 checks whether the AF mode is set to a continuous AF mode or a single AF mode. If the AF mode is set to the continuous AF mode (YES in step S203), the processing proceeds to step S204. If the AF mode is set to the single AF mode (NO in step S203), the processing proceeds to step S207. The above-described AF mode is set in advance according to an instruction from a user via the shooting mode SW 119. The single AF mode is an AF mode in which a focus detection operation is executed one time immediately before the shooting operation so that focus is achieved on an object. The continuous AF mode is an AF mode in which the focus detection operation is repeatedly executed before the shooting operation to achieve good focus on the object. The continuous AF mode includes a servo AF mode, which is operable prioritizing the focus detection operation rather than a visual quality of the EVF display. In other words, the continuous AF mode or the servo AF mode is an operation mode in which the adjustment of position of the focus lens is continuously performed.

In step S204, the control unit 115 checks whether, in an instruction from a user via the operation unit 118, the visual quality of the EVE display is prioritized or an AF tracking which repeatedly executes the focus detection operation is prioritized. If the visual quality of the EVE display is prioritized (YES in step S204), the processing proceeds to step S205. If the AF tracking is prioritized (NO in step S204), the processing proceeds to step S206.

Figure 3:
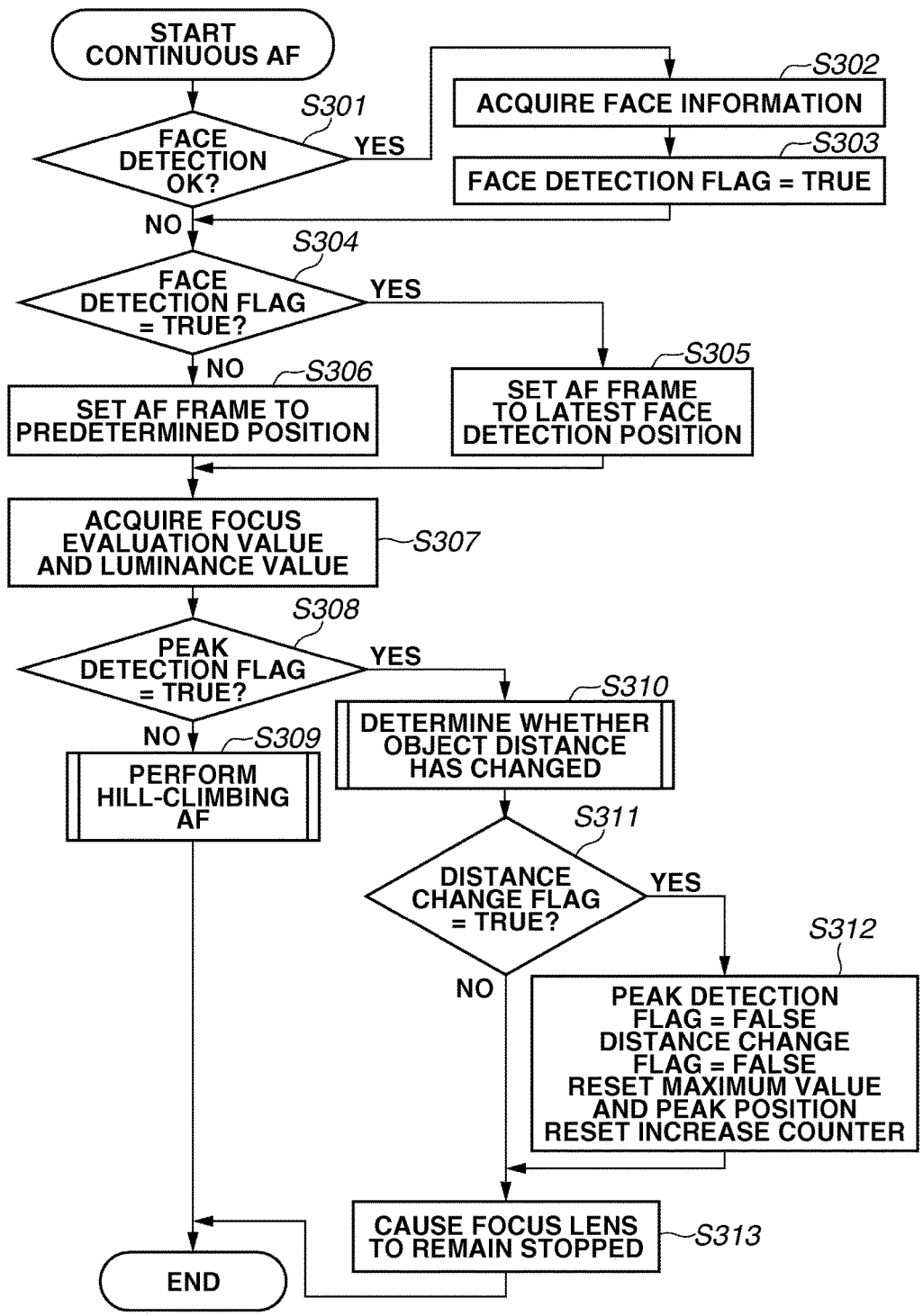
FIG. 3 is a flowchart illustrating a subroutine of a continuous AF operation.

In step S205, the control unit 115 performs the continuous AF according to the flowchart of FIG. 3 described below, and then the processing proceeds to step S207. In step S206, the control unit 115 performs the servo AF according to the flowchart of FIG. 4 described below, and then the processing proceeds to step S207.

In step S207, the control unit 115 checks a state of the first switch 121. If the first switch is ON (YES in step S207), the processing proceeds to step S208. If the first switch is OFF (NO in step S207), the processing proceeds to step S201. In step S208, the control unit 115 performs the AE processing from an output of the image processing unit 110 by the AE processing unit 103, and then the processing proceeds to step S209, in step S209, the control unit 115 checks a state of the in-focus flag. If the in-focus flag is TRUE (YES in step S209), the processing proceeds to step S211. If the in-focus flag is FALSE (NO in step S209), the processing proceeds to step S210.

Figure 7:
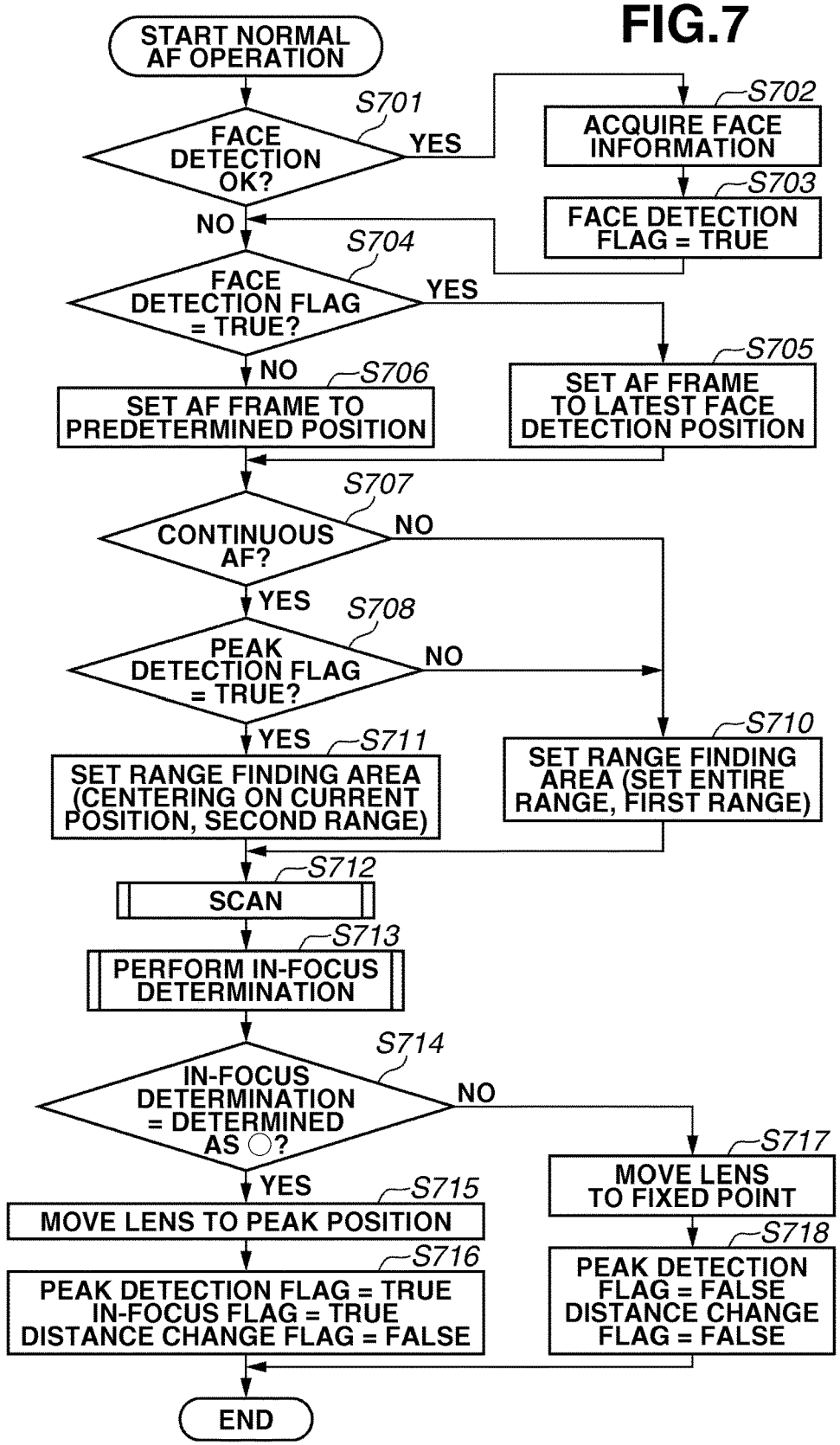
FIG. 7 is a flowchart illustrating a subroutine of a normal AF operation.

In step S210, the control unit 115 performs a normal AF operation according to the flowchart of FIG. 7 described below, and then the processing proceeds to step S211. In step S211, the control unit 115 checks whether the AF mode is set to the servo AF mode. If the AF mode is set to the servo AF mode (YES in step S211), the processing proceeds to step S212. If the AF mode is not set to the servo AF mode (NO in step S211), the processing proceeds to step 213. In step S212, the control unit 115 performs the servo AF according to the flowchart of FIG. 4 described below, and then the processing proceeds to step S213.

In step S213, the control unit 115 checks a state of the first switch 121. If the first switch 121 is ON (YES in step S213), the processing proceeds to step S214. If the first switch 121 is OFF (NO in step S213), the processing proceeds to step S201. In step S214, the control unit 115 checks a state of the second switch 122. If the second switch 122 is ON (YES in step S214), the processing proceeds to step S215. If the second switch 122 is OFF (NO in step S214), the processing proceeds to step S211. In step S215, the control unit 115 performs a shooting operation according to the flowchart of FIG. 17 described below, and then the processing proceeds to step S201.

Through the above-described processing, in the imaging apparatus 1, the processing from step S201 to step S207 will be performed in a loop, until the power is turned ON and the first switch 121 is turned ON. Further, in the imaging apparatus 1, when the first switch 121 is turned ON, the processing from step S208 to step S213 will be performed, and in a state that the first switch 121 remains to be ON and the second switch 122 is turned OFF, the processing from step S211 to step S213 will be performed in a loop. Then, when the second switch 122 is turned ON, in a state that the first switch 121 is turned ON, the shooting process will be performed.

Next, a subroutine of the continuous AF in step S205 in the flowchart of FIG. 2 will be described below with reference to the flowchart of FIG. 3. As illustrated in FIG. 3, when the continuous AF is started, then in step S301, the control unit 115 checks whether face detection is available in the face detection module 123. If the face detection is available (YES in step S301), the processing proceeds to step S302. If the face detection is not available (NO in step S301), the processing proceeds to step S304.

In steep S302, the control unit 115 acquires face information such as a face position and a face size detected by the face detection module 123, and then the processing proceeds to step S303. In step S303, the control unit 115 sets a face detection flag, which indicates that a face has been detected, to TRUE, and then the processing proceeds to step S304.

In step S304, the control unit 115 checks a state of the face detection flag. If the face detection flag is TRUE (YES in step S304), the processing proceeds to step S305. If the face detection flag is FALSE (NO in step S304), the processing proceeds to step S306.

In step S305, the control unit 115 sets an AF frame (focus detection area) to a latest face detection position detected by the face detection module 123, and then the processing proceeds to step S307. In this process, a size of the AF frame when a face is detected, may be set to a predetermined size set in advance in a ROM or the like, or may be set to a size corresponding to a face size detected by the face detection module 123. In step S306, the control unit 115 sets the AF frame to a predetermined position set in advance such as a central area, and then the processing proceeds to step S307. In step S307, the control unit 115 acquires a focus evaluation value (contrast value) and a luminance value in an image area within the AF frame set in step S305 or S306, and then the processing proceeds to step S308.

In step S308, the control unit 115 checks a state of the peak detection flag, which indicates that a peak has been detected in a hill-climbing AF operation in step S309 described below. If the peak detection flag is TRUE (YES in step S308), the processing proceeds to step S310. If the peak detection flag is FALSE (NO in step S308), the processing proceeds to step S309. In step S309, the control unit 115 performs the hill-climbing AF operation according to the flowchart of FIG. 5 described below. Then, a subroutine of the continuous AF ends, and then the processing proceeds to step S207.

Figure 6:
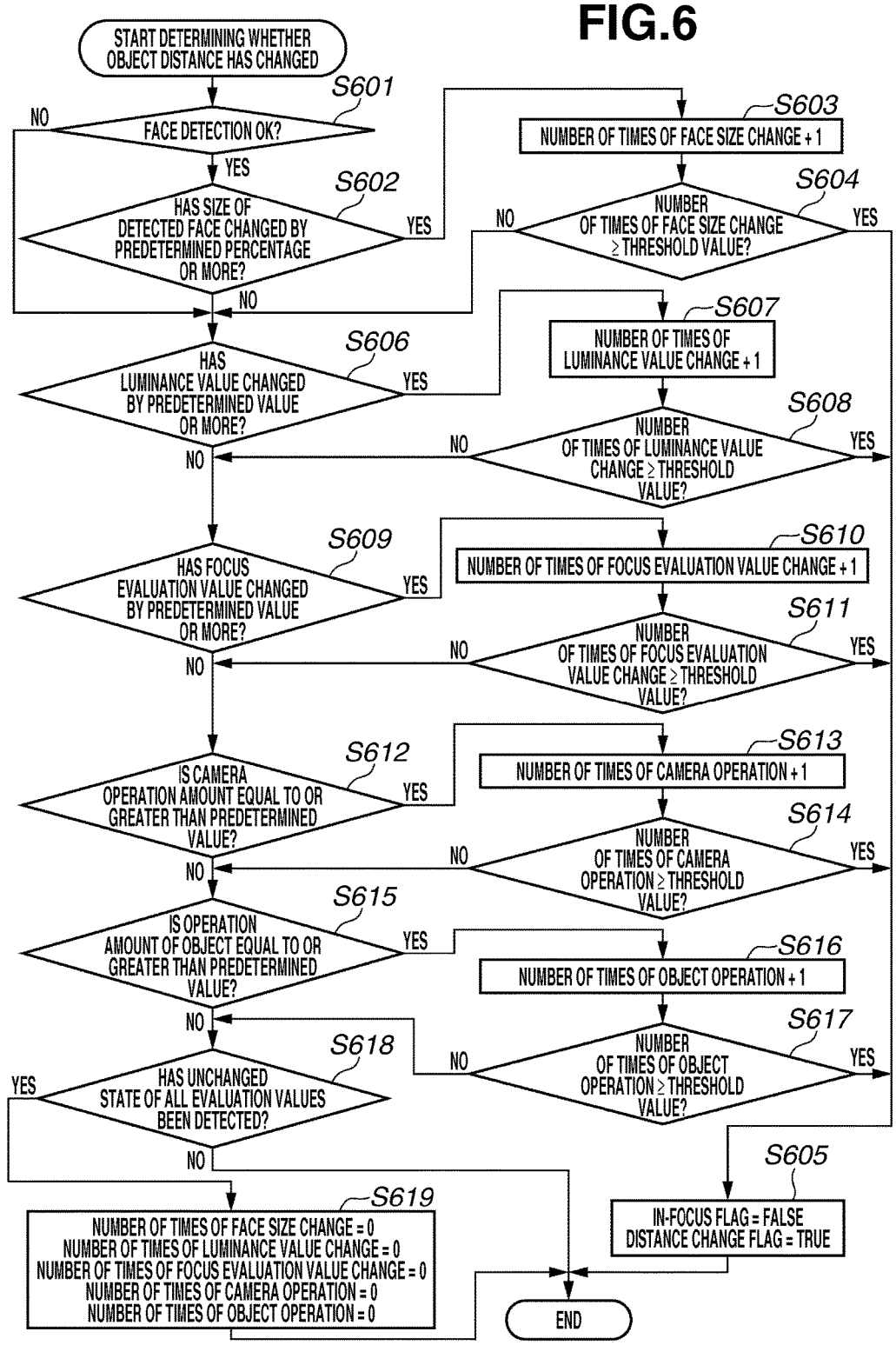
FIG. 6 is a flowchart illustrating a subroutine of determining whether object distance has changed.

In step S310, the control unit 115 determines whether an object distance has changed, according to the flowchart of FIG. 6 described below, and then the processing proceeds to step S311. In step S311, the control unit 115 checks a state of the distance change flag, which indicates the object distance has changed. If the distance change flag is TRUE (YES in step S311), the processing proceeds to step S312. If the distance change flag is FALSE (NO in step S311), the processing proceeds to step S313.

In step S312, the control unit 115 sets the peak detection flag and the distance change flag to FALSE. After that, the control unit 115 resets a maximum value of a focus evaluation value, a peak position, used in the subroutine of the hill-climbing AF operation in step S309, and the increase counter, which indicates an increase of the focus evaluation value, and then the processing proceeds to step S313. In step S313, the control unit 115 causes the focus lens to remain stopped, and then the processing proceeds to step S207.

Figure 4:
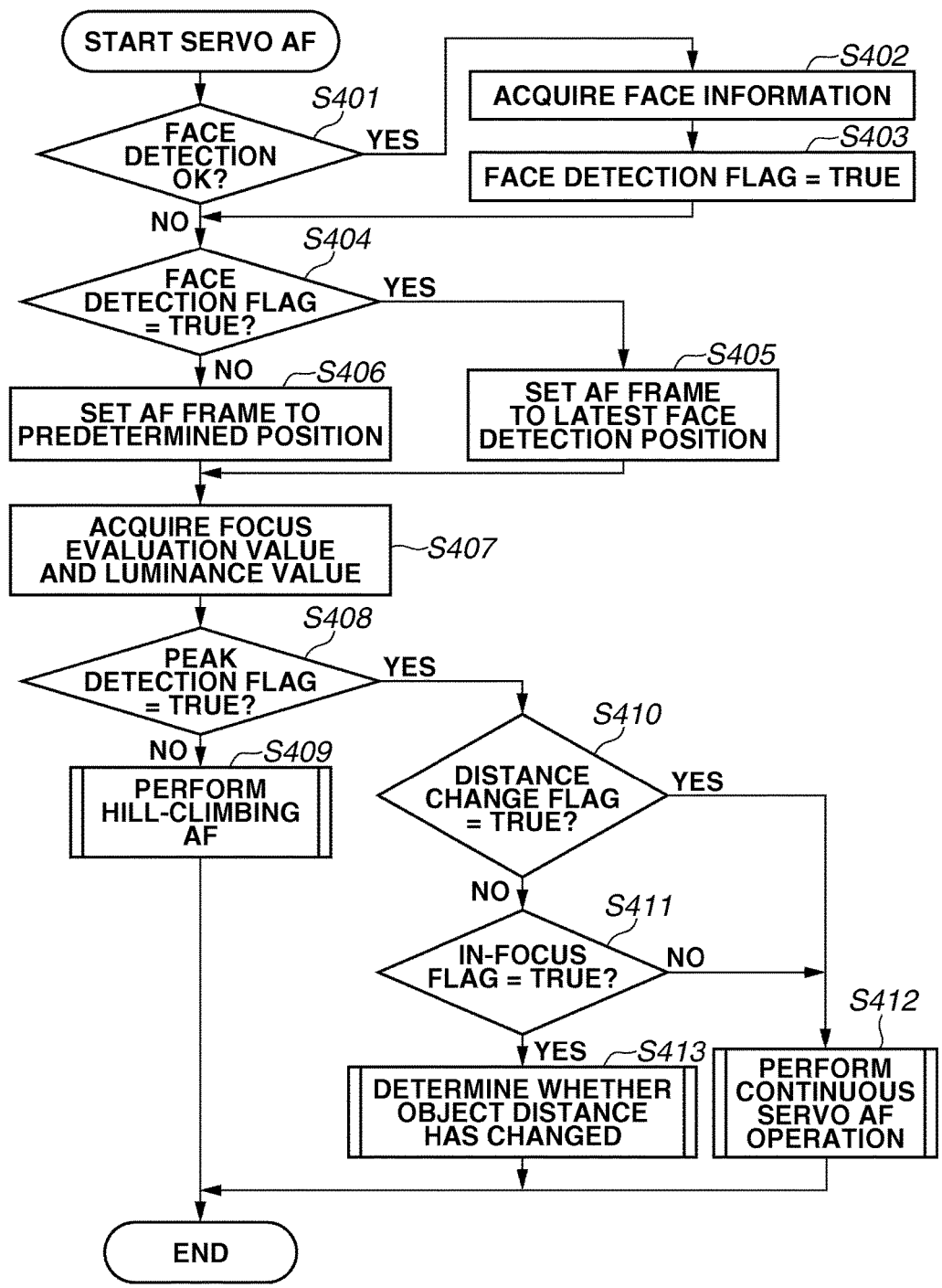
FIG. 4 is a flowchart illustrating a subroutine of a servo AF operation.

Next, a subroutine of the servo AF operation in steps S206 and S212 in the flowchart of FIG. 2 will be described below with reference to the flowchart of FIG. 4. As illustrated in FIG. 4, when the servo AF operation is started, the control unit 115 checks whether face detection is available in the face detection module 123 in step S401. If the face detection is available (YES in step S401), the processing proceeds to step S402. If the face detection is not available (NO in step S401), the processing proceeds to step S404.

In step S402, the control unit 115 acquires face information such as face position/face size detected by the face detection module 123, and then the processing proceeds to step S403. In step S403, the control unit 115 sets the face detection flag, which indicates that the face is being detected, to TRUE, and then the processing proceeds to step S404.

In step S404, the control unit 115 checks a state of the face detection flag. If the face detection flag is TRUE (YES in step S404), the processing proceeds to step S405. If the face detection flag is FALSE (NO in step S404), the processing proceeds to step S406.

In step S405, the control unit 115 sets the AF frame to a latest face detection position detected by the face detection module 123, and then the processing proceeds to step S407.

Alternatively, the control unit 115 may set a size of the AF frame when the face is being detected to a predetermined size set in advance, or may set it to a size corresponding to a detected-face size. In step S406, the control unit 115 sets the AF frame to a predetermined position set in advance such as a central area, and then the processing proceeds to step S407. In step S407, the control unit 115 acquires a focus evaluation value and a luminance value in an image area within the AF frame, which has been set in step S405 or S406, and then the processing proceeds to step S408.

In step S408, the control unit 115 checks a state of the peak detection flag, which indicates that a peak is detected in the hill-climbing AF operation of S409 described below. If the peak detection flag is TRUE (YES in step S408), the processing proceeds to step S410. If the peak detection flag is FALSE (NO in step S408), the processing proceeds to step S409. In step S409, the control unit 115 performs the hill-climbing AF operation according to the flowchart of FIG. 5 described below. Then, a subroutine of the servo AF operation ends. Then, the processing proceeds to step S207 or S213.

In step S410, the control unit 115 checks a state of the distance change flag, which indicates that the object distance has changed. If the distance change flag is TRUE (YES in step S410), the processing proceeds to step S412. If the distance change flag is FALSE (NO in step S410), the processing proceeds to step S411. In step S411, the control unit 15 checks whether the in-focus flag is TRUE. If the in-focus flag is TRUE (YES in step S411), the processing proceeds to step S413. If the in-focus flag is FALSE (NO in step S411), the processing proceeds to step S412.

Figure 8:
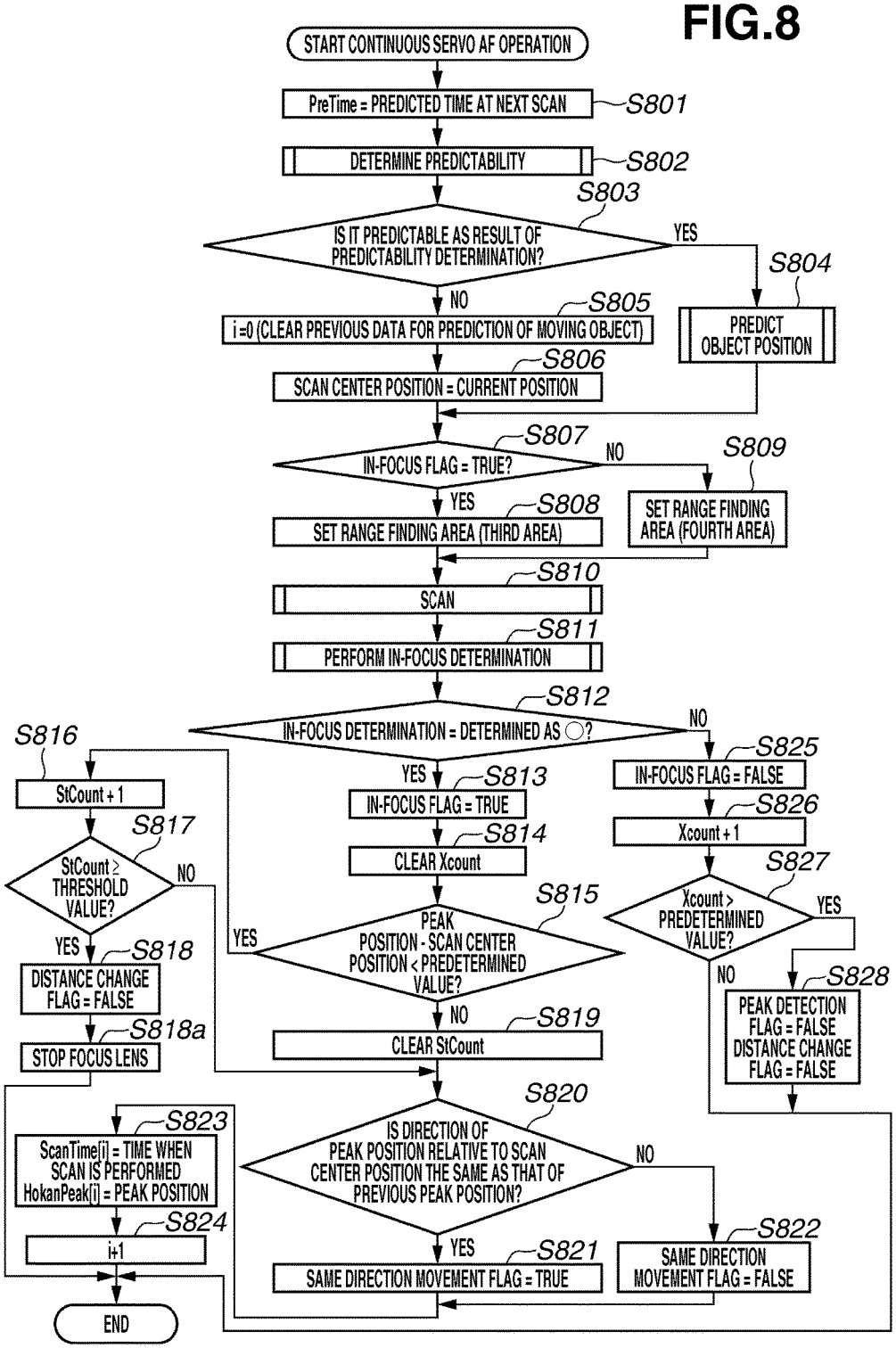
FIG. 8 is a flowchart illustrating a subroutine of a continuous servo AF operation.

In step S412, the control unit 115 performs a continuous servo AF operation according to the flowchart of FIG. 8 described below. Then, the subroutine of the servo AF operation ends. Then, the processing proceeds to step S207 or S213. In step S413, the control unit 115 determines whether the object distance has changed according to the flowchart of FIG. 6 described below. Then, a subroutine of the servo AF operation ends. Then, the processing proceeds to step S207 or S213.

Figure 5:
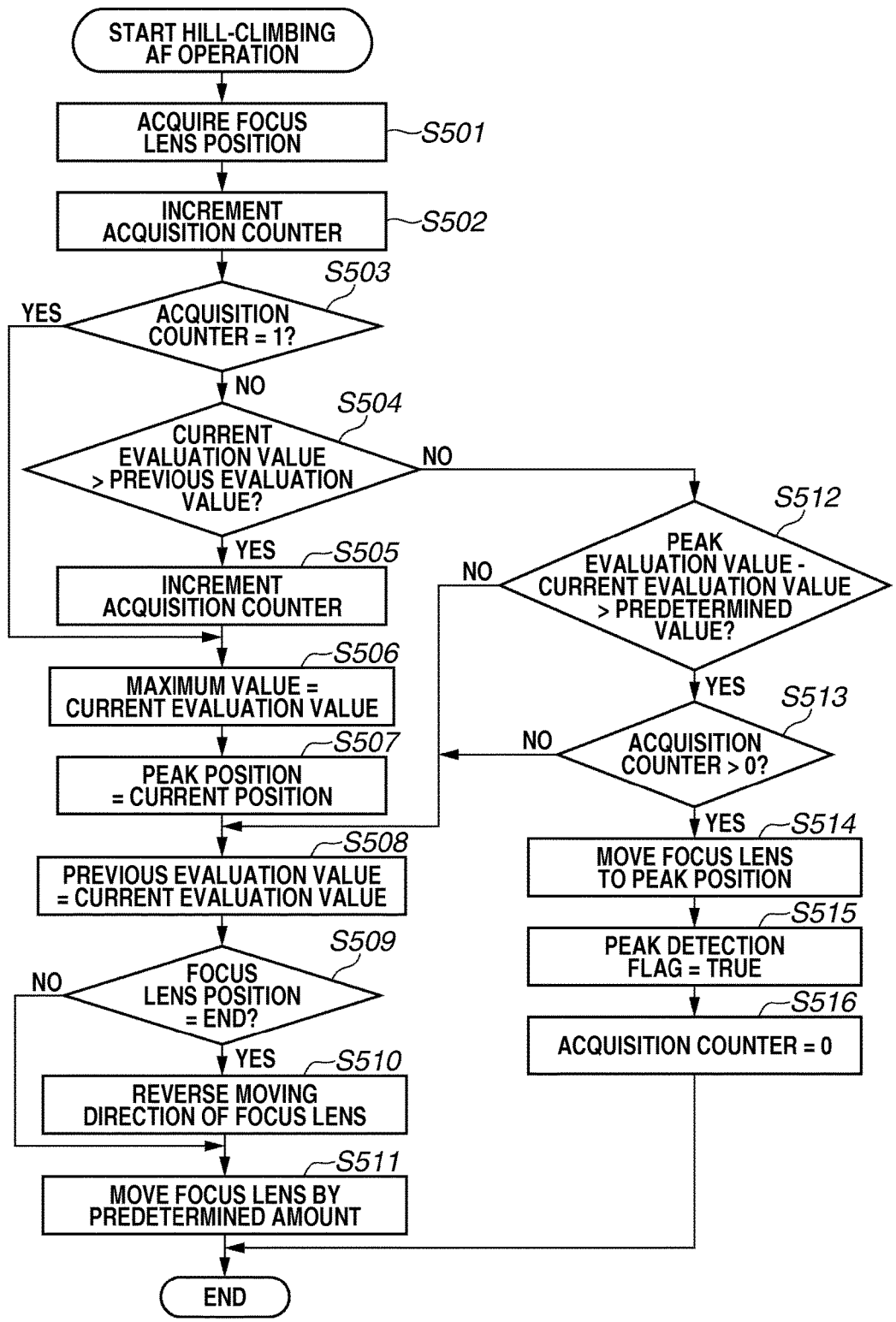
FIG. 5 is a flowchart illustrating a subroutine of a hill-climbing AF operation.

Next, a subroutine of the hill-climbing AF operation in step S309 in the flowchart of FIG. 3 and step S409 in the flowchart of FIG. 4 will be described below with reference to the flowchart of FIG. 5. As illustrated in FIG. 5, when the hill-climbing AF operation is started, in step S501, the control unit 115 acquires a current position of the focus lens 104, and then the processing proceeds to step S502.

In step S502, the control unit 115 acquires a focus evaluation value and a luminance value in the image area within the AF frame which has been set, and increments the acquisition counter for counting acquisitions of current positions of the focus lens 104, and then the processing proceeds to step S503. The acquisition counter is assumed to be set in advance to 0 (or NULL value) in an initialization operation (not illustrated).

In step S503, the control unit 115 checks whether the value of the acquisition counter is 1. If the value of the acquisition counter is 1 (YES in step S503), the processing proceeds to step S506. If the value of the acquisition counter is not 1 (NO in step S503), the processing proceeds to step S504.

In step S504, the control unit 115 checks whether a "current focus evaluation value" acquired in nearest preceding processing is greater than a "previous focus evaluation value" acquired in the preceding processing. If the "current focus evaluation value" is greater than the "previous focus evaluation value" (YES in step S504), the processing proceeds to step S505. If the "current focus evaluation value" is equal to or smaller than the "previous focus evaluation value" (NO in step S504), the processing proceeds to step S512.

In step S505, the control unit 115 increments by 1 the increase counter, which indicates the "current focus evaluation value" is greater than the "previous focus evaluation value", and then the processing proceeds to step S505. The increase counter is assumed to be set in advance to 0 (or NULL value) in the initialization operation described above.

In step S506, the control unit 115 stores the current focus evaluation value in an arithmetic memory (not illustrated) incorporated in the control unit 115 as a maximum value (peak evaluation value) of focus evaluation values, and then the processing proceeds to step S507. In step S507, the control unit 115 stores a current position of the focus lens 104 in the arithmetic memory incorporated in the control unit 115 as a peak position of the focus evaluation value, and then the processing proceeds to step S508. In step S508, the control unit 115 stores a current focus evaluation value in the arithmetic memory incorporated in the control unit 115 as the previous focus evaluation value, and then the processing proceeds to step S509.

In step S509, the control unit 115 checks whether the current position of the focus lens 104 is at an end of a movement range set in advance. If the focus lens is located at the end of the movement range (YES in step S509), the processing proceeds to step S510. If the focus lens is not located at the end of the movement range (NO in step S509), the processing proceeds to step S511. Note that the movement range is representative of the movement range of the focus lens 104 set by processing described below, and a movable range of the focus lens 104 is assumed to have been set in advance in a standard state. A scanning operation such as the hill-climbing AF operation is performed by moving the focus lens 104 within the movement range previously set.

In step S510, the control unit 115 reverses a moving direction of the focus lens 104, and then the processing proceeds to step S511. In step S511, the control unit 115 moves the focus lens 104 by a predetermined amount set in advance. Then, a subroutine of the hill-climbing AF operation ends.

In step S512, the control unit 115 reads out a peak evaluation value stored in the arithmetic memory, and checks whether "peak evaluation value−current focus evaluation value" is greater than a predetermined amount set in advance (threshold value). If the difference is greater than the predetermined amount (YES in step S512), the processing proceeds to step S513. If the difference is equal to or less than the predetermined amount (NO in step S512), the processing proceeds to step S508. In this process, if the "peak evaluation value−current focus evaluation value" is greater than the predetermined amount, and the current focus evaluation value is decreased by the predetermined amount from the peak evaluation value, the peak evaluation value is regarded as a focus evaluation value when focusing on the object. In other words, the focus lens 104 is moved within the movement range, and an inflection point where the focus evaluation value turns from an increase to a decrease is regarded as a focus evaluation value when focusing on the object.

In step S513, the control unit 115 checks whether the increase counter is greater than 0. If the increase counter is greater than 0 (YES in step S513), the processing proceeds to step S514. If the increase counter is equal to or smaller than 0 (NO in step S513), the processing proceeds to step S508.

In step S514, the control unit 115 moves the focus lens 104 to a peak position where a focus evaluation value stored in S507 becomes a maximum value, and then the processing proceeds to step S515. In step S515, the control unit 11 sets the peak detection flag to TRUE, and then the processing proceeds to step S516. In step S516, the control unit 115 sets the acquisition counter to 0, and then the processing proceeds to step S207.

Next, a subroutine of determining whether object distance has changed in step S310 in the flowchart of FIG. 3 and step S413 in the flowchart of FIG. 4 will be described below with reference to the flowchart of FIG. 6. As illustrated in FIG. 6, when a subroutine of determining whether the object distance has changed is started, the control unit 115 checks whether a face detection is available in the face detection module 123 in step S601. If the face detection is available (YES in step S601), the processing proceeds to step S602. If the face detection is not available (NO in step S601), the processing proceeds to step S606.

In step S602, the control unit 115 checks whether a size of face detected in a current processing has changed by a predetermined percentage set in advance or more with respect to a size of face detected in a previous processing. In other words, in step S602, in the operation mode in which the adjustment of a position of the focus lens is continuously performed, the control unit 115 detects presence or absence of change in a distance from the object depending on whether a size of face region of a person continuously acquired has changed by a predetermined percentage or more. If the size of detected face has changed by the predetermined percentage or more (YES in step S602), the processing proceeds to step S603. If the size of detected-face has not changed by the predetermined percentage or more (NO in step S602), the processing proceeds to step S606. In step S603, the control unit 115 increments the number of times of detected-face size change, and then the processing proceeds to step S604. In step S604, the control unit 115 checks whether the number of times of face size change is equal to or greater than a threshold value set in advance. If the number of times of face size change is equal to or greater than the threshold value (YES in step S604), the processing proceeds to step S605. If the number of times of face size change is less than the threshold value (NO in step S604), the processing proceeds to step S606. In step S605, the control unit 115 sets the in-focus flag to FALSE and sets the distance change flag to TRUE. Then, a subroutine of determining whether the object distance has changed ends.

In step S606, the control unit 115 checks whether a luminance value acquired in the current processing has changed by a predetermined value set in advance or more with respect to a luminance value acquired in the previous processing. In other words, in step S606, the presence or absence of change in a distance from the object is detected, depending on whether a change amount of continuously acquired luminance values has changed by the predetermined value or more, in the operation mode in which the adjustment of position of the focus lens is continuously performed. If the luminance value has changed by the predetermined value or more (YES in step S606), the processing proceeds to step S607. If the luminance value has not changed by the predetermined value or more (NO in step S606), the processing proceeds to step S609. In step S607, the control unit 115 increments the number of times of luminance value change, and then the processing proceeds to step S608. In step S608, the control unit 115 checks whether the number of times of the luminance value change is equal to or greater than a threshold value set in advance. If the number of times is equal to or greater than the threshold value (YES in step S608), the processing proceeds to step S605. If the number of times is less than the threshold value (NO in step S608), the processing proceeds to step S609.

In step S609, the control unit 115 checks whether a focus evaluation value acquired in the current processing has changed by a predetermined value set in advance or more, with respect to a focus evaluation value acquired in the previous processing. In other words, in step S609, the presence or absence of change in a distance from the object is detected depending on whether a change amount of the focus evaluation value continuously acquired, in the operation mode in which the adjustment of a position of the focus lens is continuously performed, has changed by the predetermined value or more. If the focus evaluation value has changed by the predetermined value or more (YES in step S609), the processing proceeds to step S610. If the focus evaluation value has not changed by the predetermined value or more (NO in step S609), the processing proceeds to step S612. In step S610, the control unit 115 increments the number of times of focus evaluation value change, and then the processing proceeds to step S611. In step S611, the control unit 115 checks whether the number of times of focus evaluation value change is equal to or greater than a threshold value set in advance. If the number of times is equal to or greater than the threshold value (YES in step S611), the processing proceeds to step S605. If the number of times is not equal to or greater than the threshold value (NO in step S611), the processing proceeds to step S612.

The control unit 115 checks whether a camera operation amount of the imaging apparatus 1 detected by the angular velocity sensor unit 125 has changed by a predetermined value set in advance or more. In other words, in step S612, the presence or absence of change in distance from the object is detected according to an operation amount of the imaging apparatus 1, in the operation mode in which the adjustment of a position of the focus lens is continuously performed. If the camera operation amount has changed by the predetermined value or more (YES in step S612), the processing proceeds to step S613. If the camera operation amount has not changed by the predetermined value or more (NO in step S612), the processing proceeds to step S615. In step S613, the control unit 115 increments the number of times of the camera operation, and then the processing proceeds to step S614. In step S614, the control unit 115 checks whether the number of times of the camera operation is equal to or greater than a threshold value set in advance. If the number of times is equal to or greater than the threshold value (YES in step S614), the processing proceeds to step S605. If the number of times is less than the threshold value (NO in step S614), the processing proceeds to step S615.

In step S615, the control unit 115 checks whether an operation amount of an object detected by the moving object detection unit 124 is equal to or greater than a predetermined value set in advance. In other words, in step S615, the presence or absence of change in a distance from the object is detected according to an operation amount of the object, in the operation mode in which the adjustment of a position of the focus lens is continuously performed. If the operation amount of the object is equal to or greater than the predetermined value (YES in step S615), the processing proceeds to step S616. If the operation amount of the object is not equal to or greater than the predetermined value (NO in step S615), the processing proceeds to step S618. In step S616, the control unit 115 increments the number of times of the object operation, and then the processing proceeds to step S617. In step S617, the control unit 115 checks whether the number of times of the object operation is equal to or greater than a threshold value set in advance. If the number of times is equal to or greater than the threshold value (YES in step S617), the processing proceeds to step S605. If the number of times is less than the threshold value (NO in step S617), the processing proceeds to step S618.

In step S618, the control unit 115 checks whether any evaluation value of a face detection size/a luminance value/a focus evaluation value is in an unchanged state, and a camera operation amount and an object operation amount are not equal to or greater than a predetermined value. If any evaluation value is in an unchanged state, and any operation amount is not equal to or greater than the predetermined value (YES in step S618), the processing proceeds to step S619. Further, if any evaluation value is in a changed state, or, any operation amount is equal to or greater than the predetermined value (NO in step S618), then the subroutine of determining whether the object distance has changed ends. In step S619, the control unit 115 sets all of the number of times of face size change/the number of times of luminance value change/the number of times of focus evaluation value change, the number of times of camera operation, and the number of times of object operation to 0 (or NULL value). Then, the subroutine of determining whether the object distance has changed ends.

As described above, the control unit 115 performs the subroutine of determining whether the object distance has changed, which detects the presence or absence of a change in the distance between the object and the imaging apparatus 1, even in the continuous AF mode or the servo AF mode. Consequently, in the imaging apparatus 1, the movement of the focus lens can be controlled according to the distance change flag, which represents a detection result that the presence or absence of change in the distance between the object and the imaging apparatus 1 has been detected, in the operation mode in which the adjustment of a position of the focus lens is continuously performed. For example, when a distance between the object and the imaging apparatus 1 has changed, the movement of the focus lens, which has been stopped, can be resumed by setting the distance change flag to TRUE.

Next, a subroutine of the normal AF operation in S210 in the flowchart of FIG. 2 will be described below with reference to the flowchart of FIG. 7. As illustrated in FIG. 7, when the normal AF operation is started, then the control unit 115 checks whether a face detection is available in the face detection module 123 in step S701. If the face detection is available (YES in step S701), the processing proceeds to step S702. If the face detection is not available (NO in step S701), the processing proceeds to step S704.

In step S702, the control unit 115 acquires face information such as face position/face size detected by the face detection module 123, and then the processing proceeds to step S703. In step S703, the control unit 115 sets the face detection flag, which indicates that the face detection is available, to TRUE, and then the processing proceeds to step S704.

In step S704, the control unit 115 checks a state of the face detection flag. If the face detection flag is TRUE (YES in step S704), the processing proceeds to step S705. If the face detection flag is FALSE (NO in step S704), the processing proceeds to step S706.

In step S705, the control unit 115 sets the AF frame to a latest face detection position, and then the processing proceeds to step S707. Alternatively, a size of the AF frame when the face is being detected may be set to a predetermined size set in advance, or may be set to a size corresponding to the detected face size. In step S706, the control unit 115 sets the AF frame to a predetermined position set in advance such as a central area, and then the processing proceeds to step S707.

In step S707, the control unit 115 checks whether the AF mode set by the shooting mode SW 119 is the continuous AF, or, the single AF mode. If the AF mode is set to the continuous AF mode (YES in step S707), the processing proceeds to step S708. If the AF mode is set to the single AF mode (NO in step S707), the processing proceeds to step S710.

In step S708, the control unit 115 checks whether the peak detection flag is TRUE. If the peak detection flag is TRUE (YES in step S708), the processing proceeds to step S711. If the peak detection flag is FALSE (NO in step S708), the processing proceeds to step S710. In step S710, the control unit 115 sets a movement range to the whole range (first range) of a movable range of the focus lens 104, and then the processing proceeds to step S712. In step S711, the control unit 115 sets a predetermined range set in advance (second range) centering on a current position of the focus lens 104 as a movement range, and then the processing proceeds to step S712.

In step S711, since a peak evaluation value at which an object is at focus has been detected, a second range, narrowed down to narrower than the first range, is set as a movement range centering on a lens position of the focus lens 104 where the peak evaluation value is attained. Therefore, in the imaging apparatus 1, a focus detection operation in the normal AF operation can be efficiently performed by the setting of the movement range in step S711.

Figure 12:
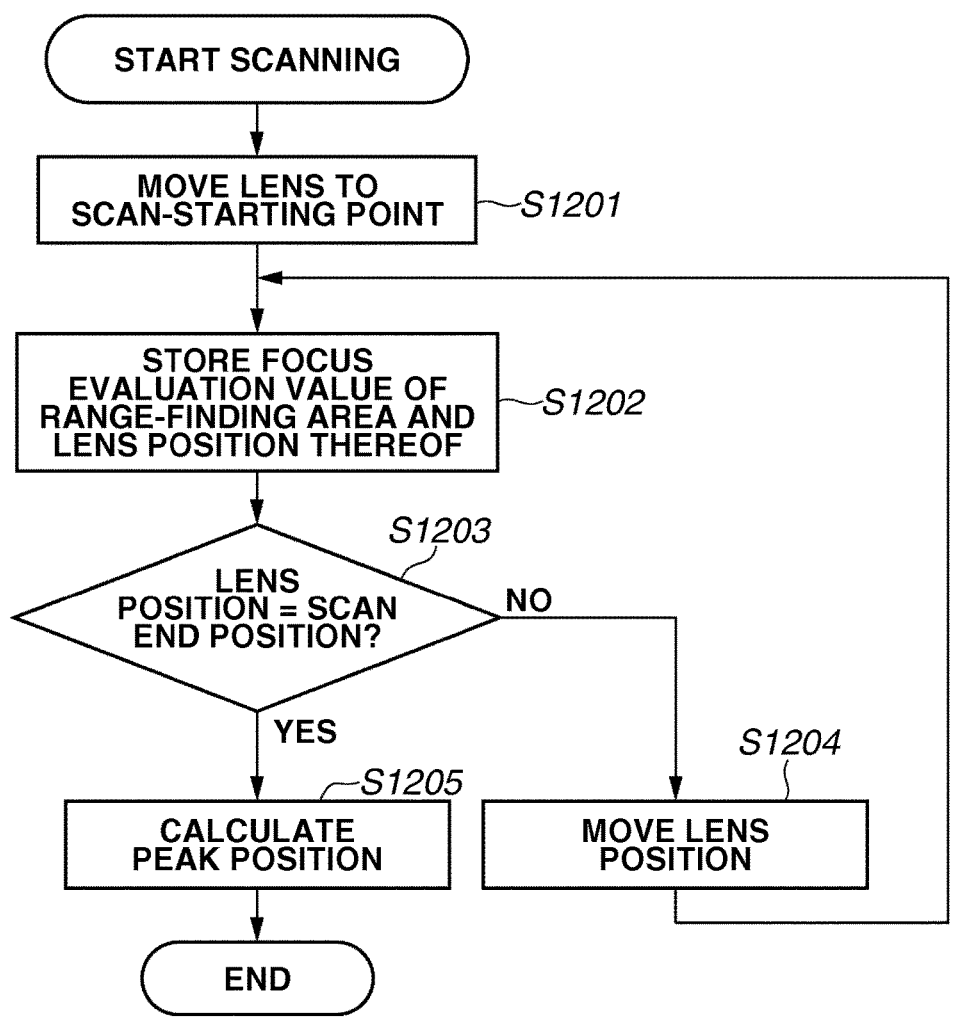
FIG. 12 is a flowchart illustrating a subroutine of scanning.

In step S712, the control unit 115 performs the focus detection operation according to the flowchart of FIG. 12 described below, and then the processing proceeds to step S713. In step S713, the control unit 115 performs the in-focus determination according to the flowchart of FIG. 13 described below, and then the processing proceeds to step S714.

In step S714, the control unit 115 checks whether a result of the in-focus determination in step S713 (the details will be described below) is determined as "○". If it is determined as "○" (YES in step S714), the processing proceeds to step S715. If it is determined as "×" (NO in step S714), the processing proceeds to step S717.

In step S715, the control unit 115 moves the focus lens 104 to a peak position calculated in the scanning in step S712, and then the processing proceeds to step S716. In step S716, the control unit 115 sets the peak detection flag and the in-focus flag to TRUE, and sets the distance change flag to FALSE. Then, the subroutine of the normal AF operation ends.

In step S717, the control unit 115 moves the focus lens 104 to a position set in advance (fixed point), and then the processing proceeds to step S718. In the process, the fixed point is set to a distance where probability that an object exists is high. If a face has been detected, the fixed point may be set to a calculated distance by estimating a distance of a person from a face size. In step S718, control unit 115 sets the peak detection flag and the distance change flag to FALSE. Then, the subroutine of the normal AF operation ends.

Next, a subroutine of the continuous servo AF operation in step S412 in the flowchart of FIG. 4 will be described below with reference to the flowchart of FIG. 8. As illustrated in FIG. 8, in step S801, the control unit 115 acquires a current time from a real time clock (RTC) unit (not illustrated), and calculates a time taken for a next scan (scan in step S810 described below). Next, the control unit 115 calculates a time (predicted time) when a position of the focus lens 104 is located at a center of the movement range, in the next scan, to determine PreTime, and then the processing proceeds to step S802. In step S802, the control unit 115 performs predictability determination according to the flowchart of FIG. 9 described below, and then the processing proceeds to step S803.

In step S803, the control unit 115 checks whether a result of the predictability determination in the predictability determination in step S802 is predictable. If the result is predictable (YES in step S803), the processing proceeds to step S804. If the result is not predictable (NO in step S803), the processing proceeds to step S805.

Figure 10:
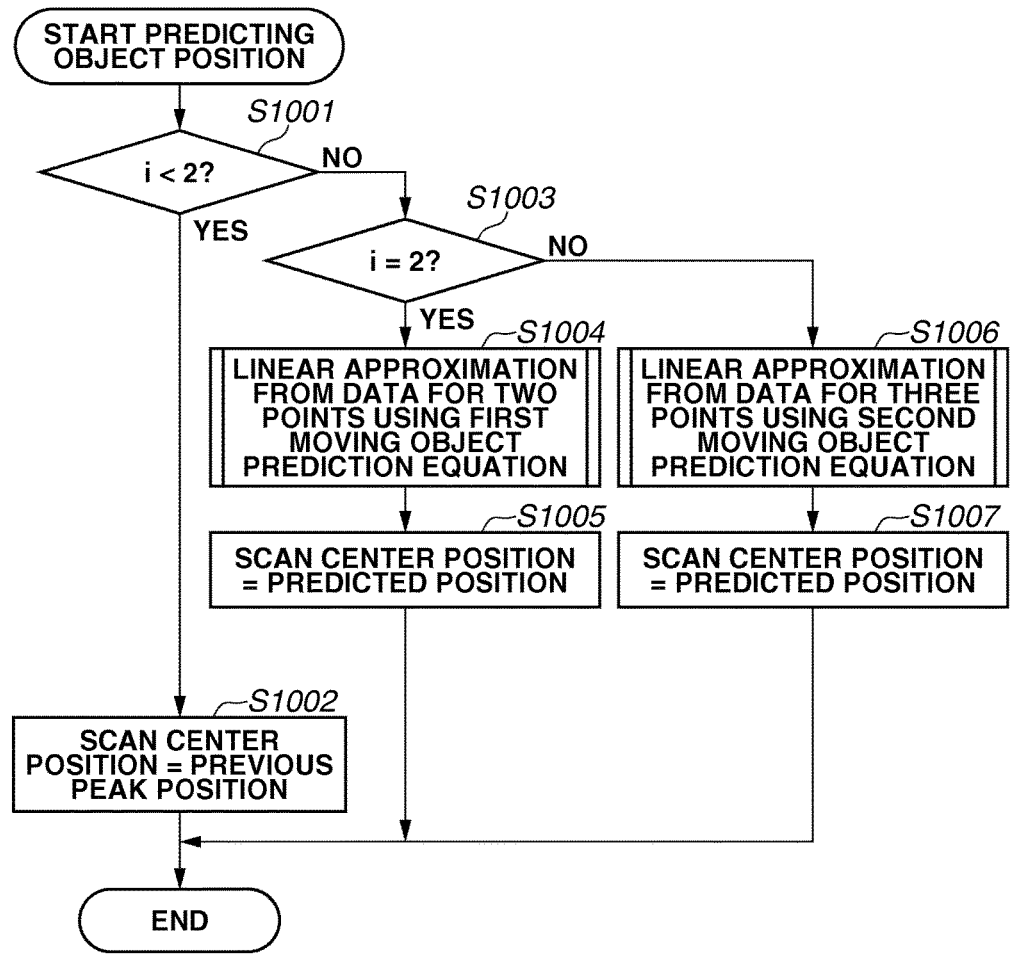
FIG. 10 is a flowchart illustrating a subroutine of predicting an object position.

In step S804, the control unit 115 predicts an object position according to the flowchart of FIG. 10 described below, and then the processing proceeds to step S807. In step S805, the control unit 115 clears previous data for prediction of a moving object as will be described below, i.e, ScanTime [0] to ScanTime [i−1] and HokanPeak [0] to HokanPeak [i−1]. Furthermore, the control unit 115 sets a variable i to 0, and then the processing proceeds to step S806. The variable i indicates the number of times that it has been consecutively determined to be predictable. In step S806, the control unit 115 sets a current position of the focus lens 104 to a scan center position, and then the processing proceeds to step S807.

In step S807, the control unit 115 checks whether the in-focus flag is TRUE. If the in-focus flag is TRUE (YES in step S807), the processing proceeds to step S808. If the in-focus flag is FALSE (NO in step S807), the processing proceeds to step S809. In step S808, the control unit 115 sets a movement range to a predetermined range set in advance (third range), and then the processing proceeds to step S810. In step S809, the control unit 115 sets the movement range to a range (fourth range) wider than the third range previously set in step S808, the processing proceeds to step S810. In step S809, it is apparent from the in-focus flag that a peak evaluation value at which an object is at the focus is not detected. Consequently, a scanning operation is performed by setting the movement range to the fourth range wider than the third range, causing focusing to the object to be unerringly performed.

In step S810, the control unit 115 performs scanning according to the flowchart of FIG. 12 described below, and then the processing proceeds to step S811. In step S811, the control unit 115 performs the in-focus determination according to the flowchart of FIG. 13 described below, and then the processing proceeds to step S812.

In step S812, the control unit 115 checks whether a result of the in-focus determination performed in step Sell is determined as "○". If the result is determined as "○" (YES in step S812), the processing proceeds to step S813. If the result is determined as "×" (NO in step S812), the processing proceeds to step S825.

In step S813, the control unit 115 sets the in-focus flag to TRUE, and then the processing proceeds to step S814. In step S814, the control unit 115 sets xcount to 0, and then the processing proceeds to step S815. The xcount indicates the number of times that the in-focus determination has not consecutively been determined as "○" (the number of times that it has been determined as "×").

In step S815, the control unit 115 checks whether a difference between a scan result (peak position) in step S810 and a scan center position is smaller than a predetermined value set in advance. If the difference is smaller than the predetermined value (YES in step S815), the processing proceeds to step S816. If the difference is not smaller than the predetermined value (NO in step S815), the processing proceeds to step S819.

In step S816, the control unit 115 increments StCount that indicates the number of times a difference between the peak position in step S810 and the scan center position has been consecutively smaller than a predetermined value, and then the processing proceeds to step S817. In step S817, the control unit 115 checks whether the StCount is equal to or greater than a threshold value set in advance. If the StCount is equal to or greater than the threshold value (YES in step S817), the processing proceeds to step S818. If the StCount is less than the threshold value (NO in step S817), the processing proceeds to step S820. In other words, the control unit 115 determines whether a focus lens position at which a focus evaluation value becomes maximal is included within a range set in advance, relative to a reference position (scan center position) determined based on an adjustment result of the focus lens 104 by the continuous servo AF operation. Then, the control unit 115 determines whether a state that the focus lens position at which the focus evaluation value becomes maximal is included within the range set in advance, is repeated by the number of times set in advance, and detects the presence or absence of a distance change.

In step S818, the control unit 115, upon determining that the distance change of the object has stopped, sets the distance change flag to FALSE. In step S818a, the control unit 115 stops a movement of the focus lens 104. Then, the subroutine of the continuous servo AF operation ends. Consequently, in the imaging apparatus 1, if the object distance does not change even in the servo AF, stopping the focus lens can prevent a scan in the servo AF from being uselessly repeated.

In step S819, the control unit 115 clears the StCount to 0, and then the processing proceeds to step S820. In step S820, the control unit 115 checks whether a direction of a current peak position relative to a current scan center position in step S810 is the same as that of a previous peak position relative to a previous scan center position. If the both directions are the same (YES in step S820), the processing proceeds to step S821. If the both directions are not the same (NO in step S820), the processing proceeds to step S822.

In step S821, the control unit 115 sets the same direction movement flag to TRUE, and then the processing proceeds to step S823. In step S822, the control unit 115 sets the same direction movement flag to FALSE, and then the processing proceeds to step S823.

In step S823, the control unit 115 assumes a time when the position of the focus lens 104 in the current scan is located at a center of a movement range to be ScanTime [i], and a peak position in the current scan to be HokanPeak [i], and then the processing proceeds to step S824. In step S824, the control unit 115 increments i. Then, the subroutine of the continuous servo AF operation ends.

In step S825, the control unit 115 sets the in-focus flag to FALSE, and then the processing proceeds to step S826. In step S826, the control unit 115 increments the xCount, and then the processing proceeds to step S827.

In step S827, the control unit 115 checks whether the xCount is greater than a predetermined value set in advance. If the xCount is greater than the predetermined value (YES in step S827), the processing proceeds to step S828. If the xCount is not greater than the predetermined value (NO in step S827), then the subroutine of the continuous servo AF operation ends. In step S828, the control unit 115 sets the peak detection flag and the distance change flag to FALSE. Then, the subroutine of the continuous servo AF operation ends.

Figure 9:
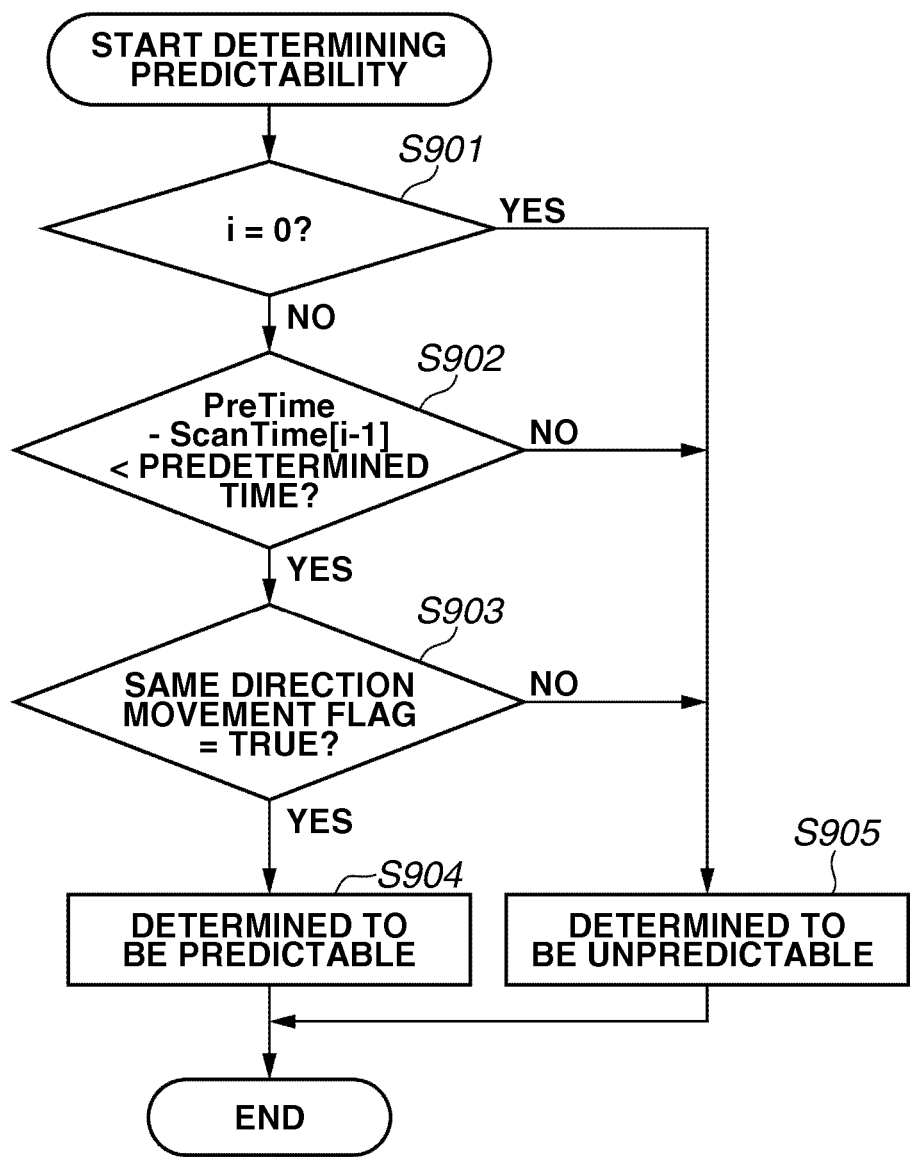
FIG. 9 is a flowchart illustrating a subroutine of a determining predictability.

Next, a subroutine of the predictability determination in step S802 in the flowchart of FIG. 8 will be described below with reference to the flowchart of FIG. 9. As illustrated in FIG. 9, in step S901, the control unit 115 checks whether i=0 for variables i in the continuous servo AF operation. If i is 0 (YES in step S901), the processing proceeds to step S905. If i is not 0 (NO in step S901), the processing proceeds to step S902.

In step S902, the control unit 115 checks whether a difference between PreTime and ScanTime [i−1] is shorter than a predetermined time set in advance. If the difference is shorter than the predetermined time (YES in step S902), the processing proceeds to step S903. If the difference is longer than the predetermined time (NO in step S902), the processing proceeds to step S905. From this, a time elapsed since a previous scan until a current scan is found, and it is possible to determine whether a prediction using a result of the previous scan is reliable. For example, if it takes a time longer than the predetermined time, it can be concluded that the prediction is not reliable.

In step S903, the control unit 115 checks whether the same direction movement flag is TRUE. If the same direction movement flag is TRUE (YES in step S903), the processing proceeds to step S904. If the same direction movement flag is FALSE (NO in step S903), the processing proceeds to step S905. Consequently, only when it is determined that an object is moving in the same direction in terms of distance direction, it is assumed that the prediction is reliable. Thereby, an erroneous prediction due to using an erroneous AF result can be reduced.

In step S904, the control unit. 115 determines a result of predictability determination to be predictable. Then, the subroutine of the predictability determination ends. Then, the processing proceeds to step S803. In step S905, the control unit 115 determines a result of the predictability determination to be unpredictable. Then, the subroutine of the predictability determination ends. Then, the processing proceeds to step S803.

Next, a subroutine of predicting the object position in step S804 in the flowchart of FIG. 8 will be described below with reference to the flowchart of FIG. 10 and the explanatory views of FIGS. 11A and 11B. As illustrated in FIG. 10, in step S1001, the control unit 115 checks whether i is smaller than 2 for variables i in the continuous servo AF operation. If i is smaller than 2 (YES in step S1001), the processing proceeds to step S1002. If i is equal to or greater than 2 (NO in step S1001), the processing proceeds to step S1003. In step S1002, the control unit 115 sets a scan center position to a peak position of a previous scan. Then, the subroutine of predicting the object position ends. Then, the processing proceeds to step S807.

In step S1003, the control unit 115 checks whether i is equal to 2. In other words, in step S1003, the control unit 115 checks whether data for predicting the moving object is two points, to determine the case of two points, and the case of three points or more. If i is equal to 2 (YES in step S1003), the processing proceeds to step S1004. if i is greater than 2 (NO in step S1003), the processing proceeds to step S1006.

Figure 11A:
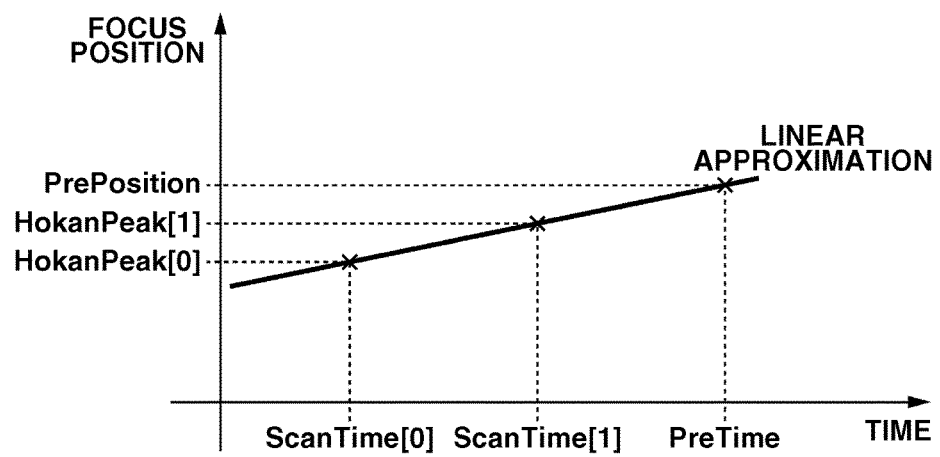
FIG. 11A is a conceptual view illustrating a calculation of object position prediction at two points.

In step S1004, the control unit 115 calculates a prediction position of an object from data for the moving object prediction for two points, as illustrated in FIG. 11A, using a first moving object prediction formulae (1) given below, and then the processing proceeds to step S1005. More specifically, the control unit 115 calculates a predicted position of the object at PreTime, i.e., PrePosition from two points of (ScanTime[0], HokanPeak[0]), and (ScanTime[1], HokanPeak[1]).

$$PrePosition=(PreTime-ScanTime[0])\times(HokanPeak[1]-HokanPeak[0])/(ScanTime[1]-ScanTime[0])+HokanPeak[0] \quad (1)$$

In step S1005, the control unit 115 sets the predicted position, of the object, i.e., PrePosition calculated in step S1004 to the scan center position. Then, the subroutine of predicting the object position ends. Then, the processing proceeds to step S807.

Figure 11B:
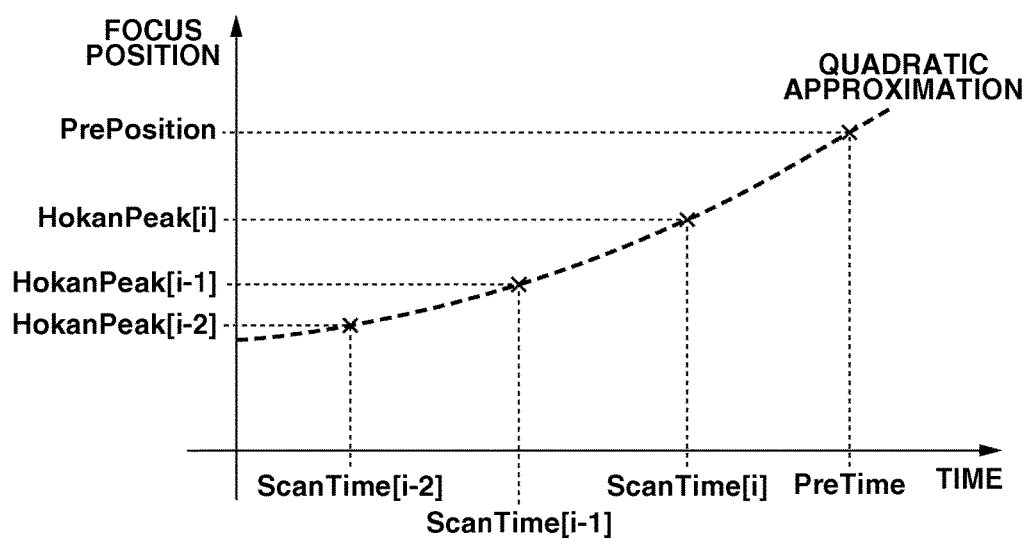
FIG. 11B is a conceptual view illustrating a calculation of object position prediction at three points.

In step S1006, the control unit 115 calculates a predicted position of an object from data for predicting the moving object for three points, as illustrated in FIG. 11B, using a second moving object prediction formulae (2) given below, and then the processing proceeds to step S1007. The data for predicting the moving object for three points are (ScanTime[i−2],HokanPeak[i−2]), (ScanTime[i−1],HokanPeak[i−1]), and (ScanTime[i],HokanPeak[i]). Therefore, the control unit 115 calculates a predicted position, i.e., PrePosition of the object at PreTime from the above-described three points.

$$PrePosition=(t3/t2)\times\{(t3-t2)\times(t2\times Pos1-t1\times Pos2)/t1/(t1-t2)+Pos2\}+HokanPeak[i-2] \quad (2)$$

where,
t1=ScanTime [i−1]−ScanTime [i−2]
t2=ScanTime[i]−ScanTime[i−2]
t3=PreTime−ScanTime[i−2]
Pos1=HokanPeak[i−1]−HokanPeak[i−2]
Pos2=HokanPeak[i]−HokanPeak[i−2].

In step S1007, the control unit 115 sets a predicted position of the object, i.e., PrePosition calculated in step S1006 to a scan center position. Then, the subroutine of predicting the object position ends. Then, the processing proceeds to step S807.

Next, a subroutine of scanning in step S712 in the flowchart of FIG. 7 and step S810 of the flowchart of FIG. 8 will be described below with reference to the flowchart of FIG. 12. As illustrated in FIG. 12, in step S1201, the control unit 15 moves the focus lens 104 to a scan-starting position. In this process, the scan-starting position is set at one end of the movement range previously set.

In step S1202, the control unit 115 stores a focus evaluation value of an image area according to an AF frame within a shooting screen and a position of the focus lens 104 in an arithmetic memory contained within the control unit 115, and then the processing proceeds to step S1203.

In step S1203, the control unit 115 checks whether a lens position of the focus lens 104 is located at a scan end position. If the lens position is located at the scan end position (YES in step S1203), the processing proceeds to step S1205. If the lens position is not located at the scan end position (NO in step S1203), the processing proceeds to step S1204. The scan end position is set to the other end of the movement range, which is an opposite side to one end of the movement range, as the scan-starting position.

In step S1204, the control unit 115 moves the focus lens 104 by a predetermined amount to a predetermined direction set in advance, and then the processing proceeds to step S1202. In step S1205, the control unit 115 reads out in sequence a focus evaluation value and a lens position thereof stored in the arithmetic memory in step S1202, to calculate a peak position of the focus evaluation value. Then, the subroutine of scanning ends.

Next, a subroutine of the in-focus determination in step S713 in the flowchart of FIG. 7 and step Sell in the flowchart of FIG. 8 will be described below with reference to FIG. 13 to FIG. 16.

Figure 13:
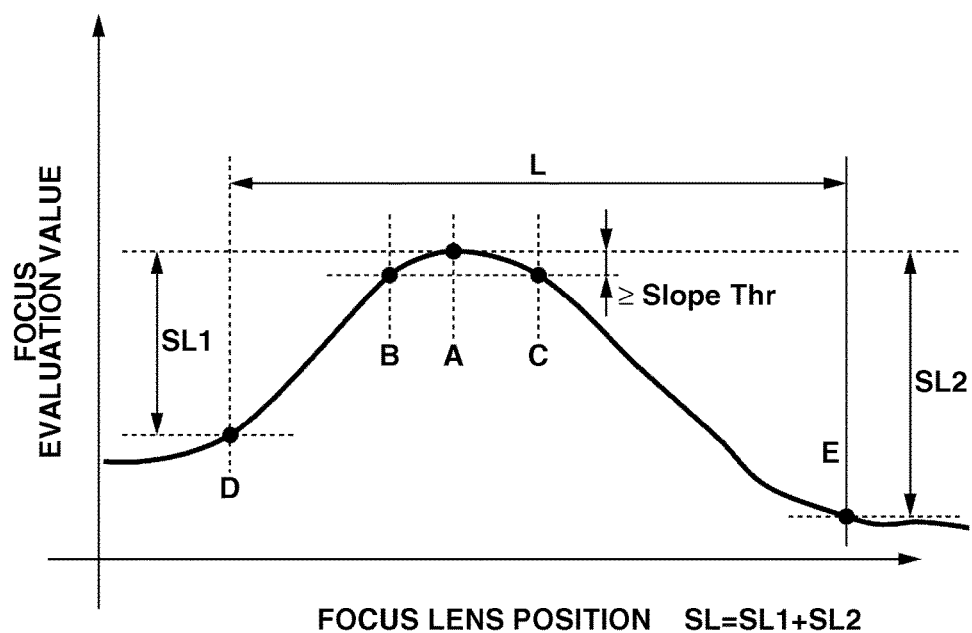
FIG. 13 is a graph illustrating a relationship between a focus evaluation value and a focus lens position.

When a graph has a focus lens position at the abscissa axis and a focus evaluation value at the ordinate axis, it has a hill shape as illustrated in FIG. 13, except for special cases, such as a conflict between far and near objects. Therefore, the imaging apparatus 1 can perform the in-focus determination by determining whether a focus evaluation value has a hill shape based on a difference between a maximum value and a minimum value of the focus evaluation value, a length of a part inclining with an inclination equal to or greater than a constant value (Slope Thr), and the slope of the inclining part. The result of the in-focus determination is output with the marks "○" and "×" given as follows:

Determined as "○": Focus adjustment of an object is possible based on a peak position of the focus evaluation value.
Determined as "×" Contrast of an object is insufficient, or an object is located at a distance outside distance range where scanned.

As illustrated in FIG. 13, points up to which inclination is continued from a hill top (point A) are denoted as point D and point E, a width between point D and point E is denoted as a width L of the hill, a difference between focus evaluation values at point A and point D is denoted as SL1, and a difference between focus evaluation values at point A and point E is denoted as SL2, and the sum of SL1+SL2 is denoted as SL.

Figure 14:
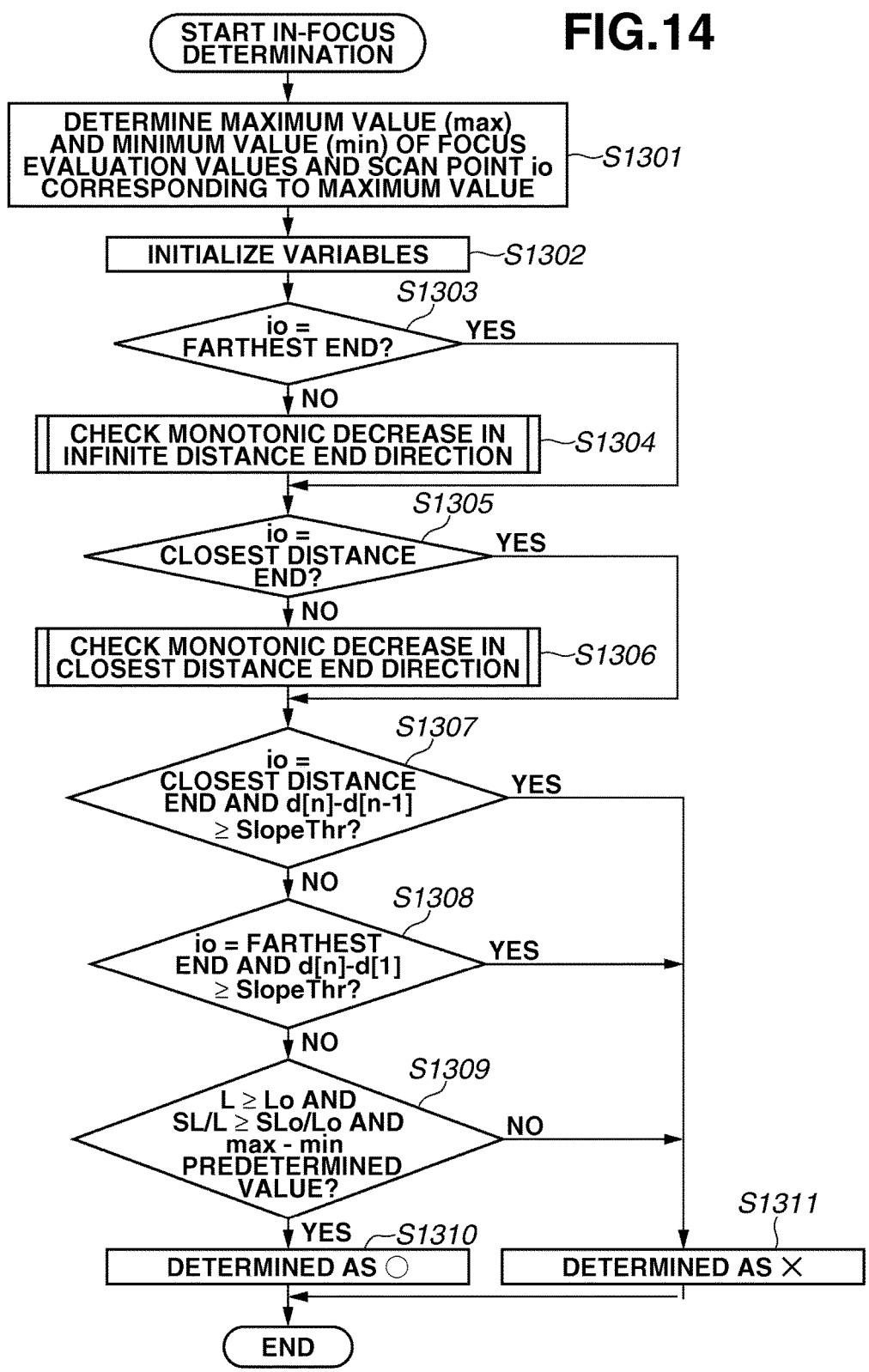
FIG. 14 is a flowchart illustrating a subroutine of an in-focus determination.

FIG. 14 is a flowchart illustrating a subroutine of the in-focus determination. As illustrated in FIG. 14, in step S1301, the control unit 115 determines a maximum value and a minimum value of focus evaluation values, and, a scan point io corresponding to the maximum value from a result of scanning described above. Then, the processing proceeds to step S1302.

Next, in step S1302, the control unit 115 initializes variables L and SL to 0, where L represents a width of the hill of a focus evaluation value, and SL represents a slope of the hill, and then the processing proceeds to step S1303. In step the control unit 115 checks whether a scan point io corresponding to the maximum value in a movement range where a scanning operation has been performed, is a farthest end position. If the scan point is not located at the farthest end position (NO in step S1303), the processing proceeds to step S1304. In step S1304, the control unit 115 checks a monotonic decrease in the infinite distance end direction. If the scan point is located at the farthest end position (YES in step S1303), the processing skips step S1304 and then proceeds to step S1305.

Figure 15:
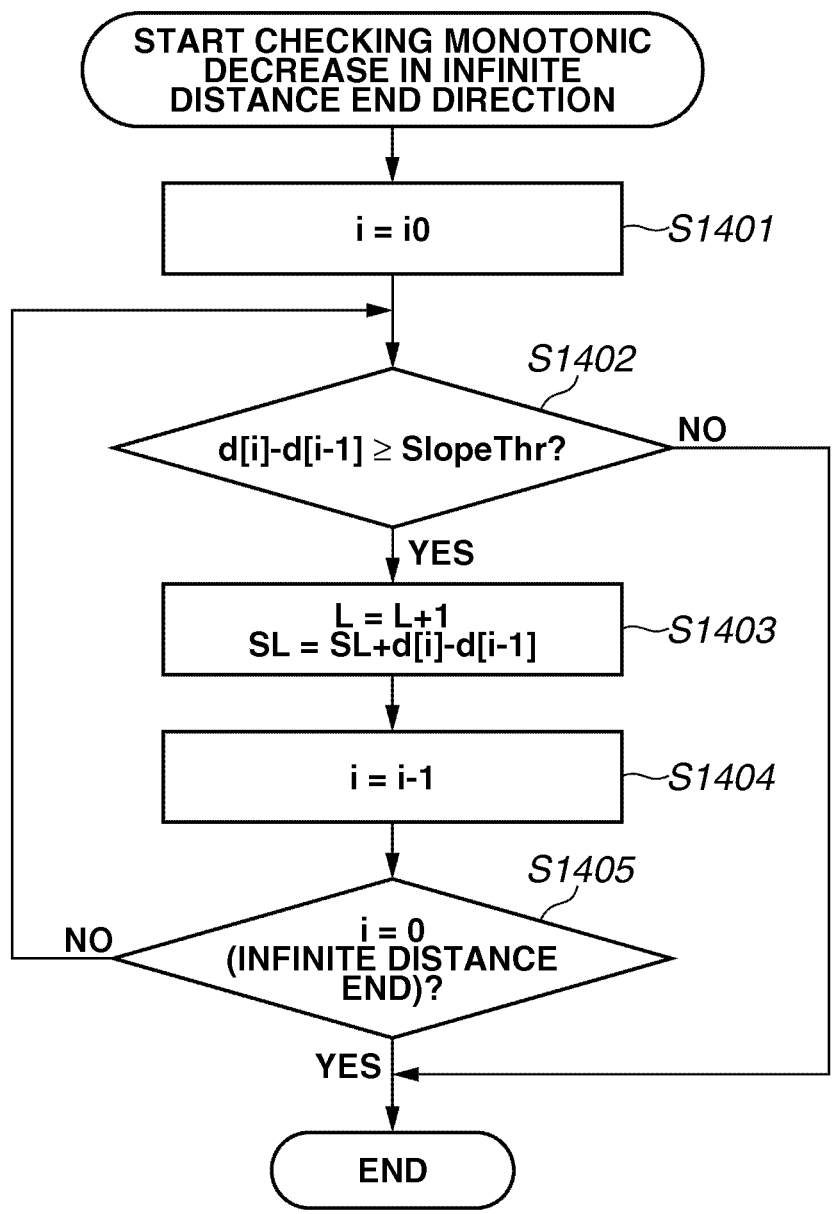
FIG. 15 is a flowchart illustrating a checking for a monotonic decrease in an infinite distance end direction.

Now, a processing for checking a monotonic decrease in the infinite distance end direction in step S1304 will be described below. As illustrated in FIG. 15, first in step S1401, the control unit 115 initializes a counter variable i to io. Then, the processing proceeds to step S1402.

In step S1402, the control unit 115 compares a difference between a value d[i] of a focus evaluation value in a scan point i and a value d[i−1] of a focus evaluation value in a scan point i−1 with a predetermined value Slope Thr set in advance. The scan point i−1 is nearer to the infinite distance end side by one scan point than the scan point i. If the relation is d[i]−d[i−1]>=Slope Thr (YES in step S1402), the control unit 115 determines that a monotonic decrease in the infinite distance end direction occurs. Then, the processing proceeds to step S1403. On the other hand, if the relation is not d[i]−d[i−1]>=Slope Thr (NO in step S1402), the control unit 115 determines that a monotonic decrease in the infinite distance end direction does not occur. Then, the processing for checking a monotonic decrease in the infinite distance end direction ends. Then, the processing proceeds to step S1305.

The processing for checking a monotonic decrease in the infinite distance end direction may be continued. In such a case, the processing proceeds to step S1403. In step S1403, the control unit 115 updates a variable L representing the length of a part (a width of hill) where the focus evaluation value inclines with an inclination equal to or greater than a specified value, and a variable SL representing an amount of decrease in a monotonic decrease section according to the following formulae. Then, the processing proceeds to step S1404.

$$L=L+1$$

$$SL=SL+(d[i]-d[i-1])$$

In step S1404, the control unit 115 decrements the counter variable i as i=i−1 to shift a point to be detected by one scan point towards the infinite distance end side. Then, the processing proceeds to step S1405. In step S1405, the control unit 115 checks whether the counter variable i has become a value at the farthest end position (=0) in a scanned predetermined movement range. If the value of the counter variable i is 0, that is, the start point to detect a monotonic decrease reaches the farthest end position in the scanned predetermined movement range (YES in step S1405), the processing for checking a monotonic decrease in the infinite distance end direction ends. Then, the processing proceeds to step S1305. In a manner described above, the imaging apparatus 1 checks a monotonic decrease of a focus evaluation value in the infinite distance end direction from i=io.

Referring back to FIG. 14, a continued subroutine of the in-focus determination will be described below. In step S1305, the control unit 115 checks whether a scan point io corresponding to a maximum value is the position of the closest distance end in a scanned predetermined movement range. If the scan point io is not the closest distance end position (NO in step S1305), the processing proceeds to step S1306. In step S1306, the control unit 115 checks a monotonic decrease in the closest distance end direction. If the scan point io is the closest distance end position (YES in step S1305), the processing skips step S1306 and then proceeds to step S1307.

Figure 16:
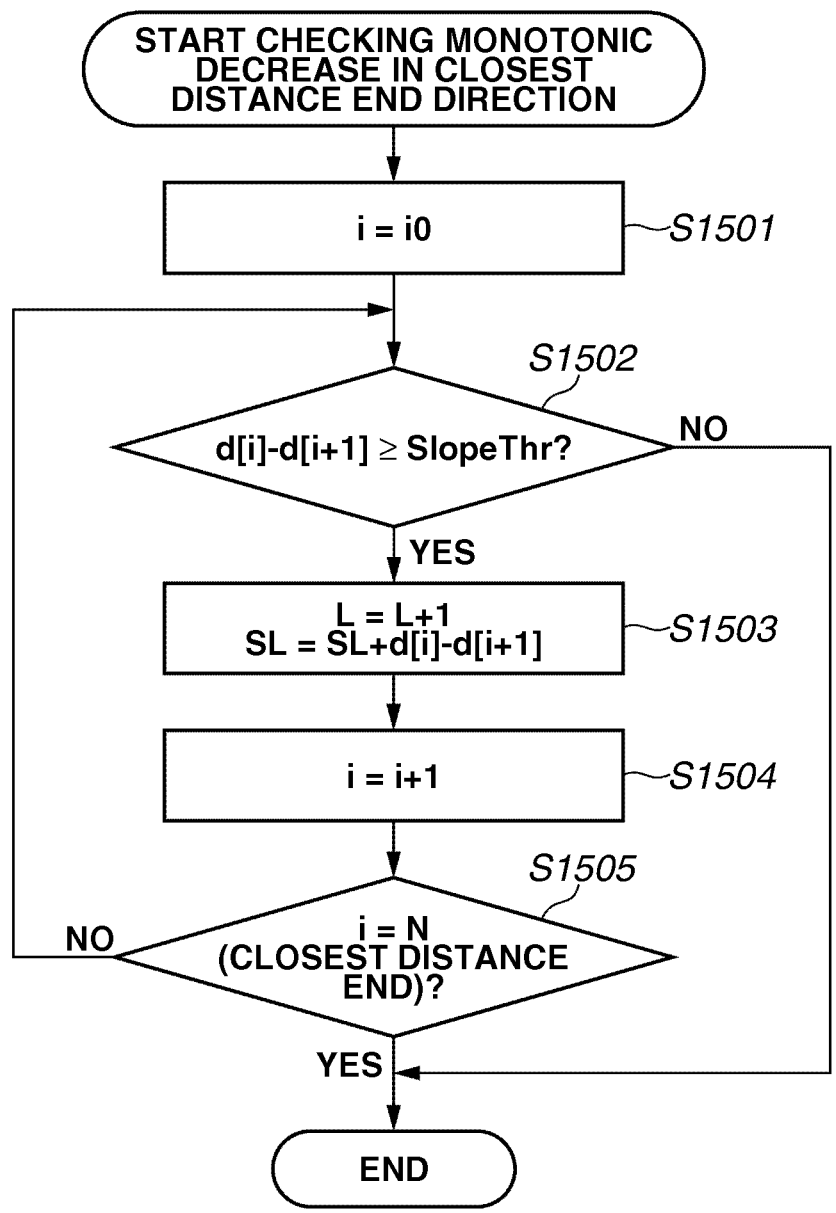
FIG. 16 is a flowchart illustrating a checking for a monotonic decrease in a closest end direction.

Now, processing for checking a monotonic decrease in the closest distance end direction in step S1306 will be described below. As illustrated in FIG. 16, first in step S1501, the control unit 115 initializes a counter variable i to io, and then the processing proceeds to step S1502.

In step S1502, the control unit 115 compares a difference between a value d[i] of a focus evaluation value in a scan point i and a d[i+1] of a focus evaluation value in a scan point i+1 with a predetermined value Slope Thr. The scan point i+1 is nearer to the closest distance end side by one scan point than the scan point i. If the relation is d[i]−d[i+1]>=Slope Thr, (YES in step S1502), the control unit 115 determines that a monotonic decrease in the closest distance end direction occurs. Then, the processing proceeds to step S1503. On the other hand, if the relation is not d[i]−d[i+1]>=Slope Thr (NO in step S1502), the control unit 115 determines that a monotonic decrease in the closest distance end direction does not occur. Then, the processing for checking a monotonic decrease in the closest distance end direction ends. Then, the processing proceeds to step S1307.

The processing for checking a monotonic decrease in the closest distance end direction may be continued. In such a case, the processing proceeds to step S1503. In step S1503, the control unit 115 updates the variable L representing the length of a part (a width of hill) where the focus evaluation value inclines with an inclination equal to or greater than a constant value, and the variable SL representing an amount of a decrease in a monotonic decrease section according to the following formulae: Then, the processing proceeds to step S1504.

$$=L+1$$

$$SL=SL+(d[i]-d[i+1])$$

In step S1504, the control unit 115 increments the counter variable i as i=i+1 to shift a point to be detected by one scan point towards the closest distance end side. Then, the processing proceeds to step S1505. In step S1505, the control unit 115 checks whether the counter variable i has become a value (=N) at the closest distance end position in a scanned predetermined movement range. If the value of the counter variable i reaches N, that is, the start point to detect a monotonic decrease reaches the closest distance end position in the scanned predetermined movement range (YES in step S1505), the processing for checking a monotonic decrease in the closest distance end direction ends. Then, the processing proceeds to step S1307. As described above, the imaging apparatus 1 checks a monotonic decrease of focus evaluation value in the closest distance end direction from i=io.

Referring back to FIG. 14, a continued subroutine of the in-focus determination will be described below. When the above-described processing for checking a monotonic decrease in the infinite distance end direction and the closest distance end direction ends, the control unit 115 compares various coefficients with respective threshold values to check whether the calculated focus evaluation value has a hill shape, thus determining as "○" or "×" More specifically, the control unit 115 determines as "○" or "×" by the processing in steps S1307 to S1309 described below.

In step S1307, the control unit 115 checks whether the scan point io corresponding to a maximum value of focus evaluation values is the closest distance end in a scanned predetermined movement range. If the scan point io is the closest distance end, the control unit 115 checks whether a difference between the value d[n] of a focus evaluation value in a scan point n of the closest distance end and a value d[n−1] of a focus evaluation value in a scan point n−1 is equal to or greater than the predetermined value Slope Thr. The scan point n−1 is nearer to the infinite distance end side by one scan point than the scan point n. If the scan point io is the closest distance end, and the difference is equal to or greater than the predetermined value Slope Thr (YES in slope 1307), the processing proceeds to step S1311. If not both of these conditions are satisfied (NO in slope 1307), the processing proceeds to step S1308.

In step S1308, the control unit 115 checks whether the scan point io corresponding to the maximum value of focus evaluation values is the farthest end in a scanned predetermined movement range. If the scan point io is the farthest end, the control unit 115 checks whether a difference between value d[0] of a focus evaluation value in the scan point 0 of the farthest end and a value d[1] of a focus evaluation value in the scan point 1 is equal to or greater than the predetermined value Slope Thr. The scan point 1 is nearer to the closest distance end side by one scan point than the scan point 0. If the scan point io is the farthest end and the difference is to or greater than the predetermined value Slope Thr (YES in step S1308), the processing proceeds to step S1311. If not both of these conditioned are satisfied (NO in step S1308), the processing proceeds to step S1309.

In step S1309, the control unit 115 checks whether the length of a part L inclining with a inclination equal to or greater than a constant value is equal to or greater than a set in advance predetermined value Lo. If the length L is equal to or greater than the predetermined value Lo, the control unit 115 checks whether the average value SL/L is equal to or greater than the set in advance predetermined value SLo/Lo, and the difference between the maximum value and the minimum value of the focus evaluation values is equal to or greater than the set in advance predetermined value. If the length L of a inclined part is equal to or greater than the predetermined value Lo, and the average value SL/L of inclination of the inclined part is equal to or greater than the predetermined value SLo/Lo, and the difference between the maximum value and the minimum value of the focus evaluation value is equal to or greater than the predetermined value (YES in step S1309), the processing proceeds to step S1310. On the other hand, if not all of these conditions described above are satisfied (NO in step S1309), the processing proceeds to step S1311.

In step S1310, the control unit 115 sets a determined result to "○" determination, since all of the determination conditions in steps S1307 to S1309 are satisfied, the calculated focus evaluation value has a hill shape, and the focus adjustment of an object is available. In step S1311, the control unit 115 sets a determined result to "×" determination since either of determination conditions in steps S1307 to S1309 is not satisfied, the calculated focus evaluation value does not have a hill shape, and the focus adjustment to an object is not available. As described above, the imaging apparatus 1 performs the in-focus determination in step S713 in the flowchart of FIG. 7 and step S811 in the flowchart of FIG. 8.

Next, a subroutine of the shooting operation in step S215 in the flowchart of FIG. 2 will be described below with reference to the flowchart of FIG. 17. As illustrated in FIG. 17, in step S1701, the control unit 115 measures an object luminance, and then the processing proceeds to step S1702. In step S1702, the control unit 115 controls the AE processing unit 103 according to the object luminance measured in step S1701, and performs exposure to the image sensor 108. Then, the processing proceeds to step S1703.

An object image formed on an image plane of the image sensor 108 by the exposure in step S1702 is subjected to a photoelectric conversion, and is output to the A/D conversion unit 109 as an analog signal (analog image data). In step S1703, in the A/D conversion unit 109, analog image data from the image sensor 108 is converted into digital image data and output, after pre-processing such as output noise elimination and nonlinear processing of the image sensor 108.

In step S1704, the control unit 115 converts digital image data output from the A/D conversion unit 109 to appropriate image data by a white balance adjustment of the WE processing unit 111 and image processing of the image processing unit 110, and then the processing proceeds to step S1705. In step S1705, the control unit 115 performs image format conversion to a format such as JPEG with respect to digital image data converted by the format conversion unit 112, and subsequently temporarily stores the image data on the DRAM 113. Then, the processing proceeds to step S1706. In step S1706, the control unit 115 stores data within the DRAM 113 on a recording medium such as a memory card by the image recording unit 114. Then, the subroutine of the shooting operation ends.

As described above, in the present exemplary embodiment, if it is determined that an object is not moving in the distance direction, a useless lens movement can be reduced by stopping the focus lens until the object moves in the next moment and a distance from the object has changed. For this reason, deterioration of visual quality of the EVF display, and battery consumption can be reduced. An in-focus position with a low reliability or erroneous in-focus position may have been obtained. In such a case, further, in the present exemplary embodiment, the cases that a focusing while tracking the object becomes unavailable, can be reduced by refraining from performing prediction of the object position.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

What is claimed is:

1. An imaging apparatus comprising:
   an image sensor configured to capture an image of an object through a photographic system including a focus lens and output image data;
   a scan unit configured to move the focus lens within a predetermined scan range, having a scan center position, defined by a scan-starting point and a scan-ending point;
   a calculation unit configured to calculate a focus evaluation value based on the image data while the scan unit moves the focus lens, and to determine a maximal focus evaluation value based on the focus evaluation value;
   a control unit configured to adjust the focus lens to a lens position where the maximal focus evaluation value was obtained; and
   a setting unit configured to set a scan range for a next scan depending on whether a direction of a lens position where the maximal focus evaluation value was obtained in a previous scan to a scan center position of the scan range in the previous scan is the same as a direction of a lens position where the maximal focus evaluation value is obtained in a present scan to a scan center position of the scan range for the present scan, or not,
   wherein, if the direction of the lens position where the maximal focus evaluation value was obtained in the previous scan to the scan center position of the scan range for the previous scan is not the same as the direction of the lens position where the maximal focus evaluation value is obtained in the present scan to the scan center position of the scan range for the present scan, the scan range for the next scan is set without using a prediction calculation.

2. The imaging apparatus according to claim 1, wherein, if the direction of the lens position where the maximal focus evaluation value was obtained in the previous scan to the scan center position of the scan range for the previous scan is the same as the direction of the lens position where the maximal focus evaluation value is obtained in the present scan to the scan center position of the scan range for the present scan, the scan range for the next scan is set based on a prediction calculation.

3. The imaging apparatus according to claim 1, wherein, if the direction of the lens position where the maximal focus evaluation value was obtained in the previous scan to the scan center position of the scan range for the previous scan is not the same as the direction of the lens position where the maximal focus evaluation value is obtained in the present scan to the scan center position of the scan range for the present scan, the scan range for a next scan is set so that the scan center position for the next scan coincides with a lens position where the maximal focus evaluation value is obtained in the present scan.

4. The imaging apparatus according to claim 1, wherein the scan unit is configured to move the focus lens in a one-way direction from the scan-starting point to the scan-ending point.

5. The imaging apparatus according to claim 1, wherein the scan unit is configured to obtain a plurality of focus evaluation values including the maximal focus evaluation value by moving the focus lens for one-way scanning at a predetermined range, including the scan center position, defined by the scan-starting point and the scan-ending point, and the predetermined range is narrower than a movement range of the focus lens.

6. The imaging apparatus according to claim 1, wherein an AF operation by the control unit with the scan unit is not a hill-climbing AF operation.

7. The imaging apparatus according to claim 1, wherein the prediction calculation is based on the lens positions corresponding to each of a plurality of the maximal focus evaluation values.

8. A method for controlling an imaging apparatus, comprising:
capturing an image of an object through a photographic system including a focus lens and outputting image data;
moving the focus lens within a predetermined scan range, having a scan center position, defined by a scan-starting point and a scan-ending point;
calculating a focus evaluation value based on the image data while moving the focus lens, and determining a maximal focus evaluation value based on the focus evaluation value;
adjusting the focus lens to a lens position where the maximal focus evaluation value was obtained; and
setting a scan range for a next scan depending on whether a direction of a lens position where the maximal focus evaluation value was obtained in a previous scan to a scan center position of previous scan is the same as a direction of a lens position corresponding to the maximal focus evaluation value obtained in a present scan to a scan center position of the present scan, or not,
wherein, if the direction of the lens position where the maximal focus evaluation value was obtained in the previous scan to the scan center position of the scan range for the previous scan is not the same as the direction of the lens position where the maximal focus evaluation value is obtained in the present scan to the scan center position of the scan range for the present scan, the scan range for the next scan is set without using a prediction calculation.

9. The method according to claim 8, wherein, if the direction of the lens position where the maximal focus evaluation value was obtained in the previous scan to the scan center position of the scan range for the previous scan is the same as the direction of the lens position where the maximal focus evaluation value is obtained in the present scan to the scan center position for the present scan, the scan range for the next scan is set based on a prediction calculation.

10. The method according to claim 8, wherein, if the direction of the lens position where the maximal focus evaluation value was obtained in the previous scan to the scan center position of the scan range for the previous scan is not the same as the direction of the lens position where the maximal focus evaluation value is obtained in the present scan to the scan center position of the scan range for the present scan, a scan range for a next scan is set so that the scan center position for the next scan coincides with a lens position where the maximal focus evaluation value is obtained in the present scan.

11. An imaging apparatus comprising:
an image sensor configured to capture an image of an object through a photographic system including a focus lens and output image data;
a scan unit configured to move the focus lens within a predetermined scan range, having a scan center position, defined by a scan-starting point and a scan-ending point;
a calculation unit configured to calculate a focus evaluation value based on the image data while the scan unit moves the focus lens, and to determine a maximal focus evaluation value based on the focus evaluation value;
a control unit configured to adjust the focus lens to a lens position where the maximal focus evaluation value was obtained; and
a setting unit configured to set a scan range for a (N+1)st scan depending on whether a direction of a lens position where the maximal focus evaluation value was obtained in the (N−1)st scan to a scan center position of the scan range for the (N−1)st scan is the same as the direction of a lens position where the maximal focus evaluation value obtained in a Nth scan to the scan center position of the scan range for the Nth scan, or not, wherein N is natural number
wherein, if the direction of the lens position where the maximal focus evaluation value was obtained in the (N−1)st scan to the scan center position of the scan range for the (N−1)st scan is not the same as the direction of the lens position where the maximal focus evaluation value is obtained in the Nth scan to the scan center position of the scan range for the Nth scan, the scan range for the (N+1)st scan is set without using a predetermined prediction calculation.

12. The imaging apparatus according to claim 11, wherein, if the direction of the lens position where the maximal focus evaluation value was obtained in the (N−1)st scan to the scan center position of the scan range for the (N−1)st scan is the same as the direction of the lens position where the maximal focus evaluation value is obtained in the Nth scan to the scan center position of the scan range for the Nth scan, the scan range for the (N+1)st scan is set based on a predetermined prediction calculation.

13. The imaging apparatus according to claim 11, wherein, if the direction of the lens position where the maximal focus evaluation value was obtained in the (N−1)st scan to the scan center position of the scan range for the (N−1)st scan is not the same as the direction of the lens position where the maximal focus evaluation value is obtained in the Nth scan to the scan center position of the scan range for the Nth scan, the scan range for a (N+1)st scan is set so that the scan center position for the (N+1)st scan coincides with a lens position where the maximal focus evaluation value is obtained in the Nth scan.

14. The imaging apparatus according to claim 11, wherein the scan unit is configured to move the focus lens in a one-way direction from the scan-starting point to the scan-ending point.

15. The imaging apparatus according to claim 11, wherein the scan unit is configured to obtain a plurality of focus evaluation values including the maximal focus evaluation value by moving the focus lens for one-way scanning at a predetermined range, including the scan center position, defined by the scan-starting point and the scan-ending point, and the predetermined range is narrower than a movement range of the focus lens.

16. The imaging apparatus according to claim 11, wherein an AF operation by the control unit with the scan unit is not a hill-climbing AF operation.

17. The imaging apparatus according to claim 11, wherein the prediction calculation is based on the lens positions corresponding to each of a plurality of the maximal focus evaluation values.

18. An imaging apparatus comprising:
an image sensor configured to capture an image of an object through a photographic system including a focus lens and output image data;
a scan unit configured to move the focus lens within a predetermined scan range, having a scan center position, defined by a scan-starting point and a scan-ending point;
a calculation unit configured to calculate a focus evaluation value based on the image data while the scan unit moves the focus lens, and to determine a maximal focus evaluation value based on the focus evaluation value;
a control unit configured to adjust the focus lens to a lens position where the maximal focus evaluation value was obtained; and
a setting unit configured to set a scan range for a next scan depending on whether a direction of a lens position where the maximal focus evaluation value was obtained in a previous scan to a scan center position of the scan range in the previous scan is the same as a direction of a lens position where the maximal focus evaluation value is obtained in a present scan to a scan center position of the scan range for the present scan, or not,
wherein, if the direction of the lens position where the maximal focus evaluation value was obtained in the previous scan to the scan center position of the scan range for the previous scan is the same as the direction of the lens position where the maximal focus evaluation value is obtained in the present scan to the scan center position of the scan range for the present scan, the scan range for the next scan is set based on a prediction calculation,
wherein, if the direction of the lens position where the maximal focus evaluation value was obtained in the previous scan to the scan center position of the scan range for the previous scan is not the same as the direction of the lens position where the maximal focus evaluation value is obtained in the present scan to the scan center position of the scan range for the present scan, the scan range for the next scan is not set based on the prediction calculation, and
wherein, the prediction calculation is based on the lens position where the maximal focus evaluation value has been obtained in the previous scan and the lens position where the maximal focus evaluation value is obtained in the present scan.

19. A method for controlling an imaging apparatus, comprising:
capturing an image of an object through a photographic system including a focus lens and outputting image data;
moving the focus lens within a predetermined scan range, having a scan center position, defined by a scan-starting point and a scan-ending point;
calculating a focus evaluation value based on the image data while moving the focus lens, and determining a maximal focus evaluation value based on the focus evaluation value;
adjusting the focus lens to a lens position where the maximal focus evaluation value was obtained; and
setting a scan range for a next scan depending on whether a direction of a lens position where the maximal focus evaluation value was obtained in a previous scan to a scan center position of previous scan is the same as a direction of a lens position corresponding to the maximal focus evaluation value obtained in a present scan to a scan center position of the present scan, or not,
wherein, if the direction of the lens position where the maximal focus evaluation value was obtained in the previous scan to the scan center position of the scan range for the previous scan is the same as the direction of the lens position where the maximal focus evaluation value is obtained in the present scan to the scan center position of the scan range for the present scan, the scan range for the next scan is set based on a prediction calculation,
wherein, if the direction of the lens position where the maximal focus evaluation value was obtained in the previous scan to the scan center position of the scan range for the previous scan is not the same as the direction of the lens position where the maximal focus evaluation value is obtained in the present scan to the scan center position of the scan range for the present scan, the scan range for the next scan is not set based on the prediction calculation, and
wherein, the prediction calculation is based on the lens position where the maximal focus evaluation value has been obtained in the previous scan and the lens position where the maximal focus evaluation value is obtained in the present scan.

20. An imaging apparatus comprising:
an image sensor configured to capture an image of an object through a photographic system including a focus lens and output image data;
a scan unit configured to move the focus lens within a predetermined scan range, having a scan center position, defined by a scan-starting point and a scan-ending point;
a calculation unit configured to calculate a focus evaluation value based on the image data while the scan unit moves the focus lens, and to determine a maximal focus evaluation value based on the focus evaluation value;
a control unit configured to adjust the focus lens to a lens position where the maximal focus evaluation value was obtained; and
a setting unit configured to set a scan range for a (N+1)st scan depending on whether a direction of a lens position where the maximal focus evaluation value was obtained in the (N−1)st scan to a scan center position of the scan range for the (N−1)st scan is the same as the direction of a lens position where the maximal focus evaluation value obtained in a Nth scan to the scan center position of the scan range for the Nth scan, or not, wherein N is natural number, wherein, if the direction of the lens position where the maximal focus evaluation value was obtained in the (N−1)st scan to the scan center position of the scan range for the (N−1)st scan is the same as the direction of the lens position where the maximal focus evaluation value is obtained in the Nth scan to the scan center position of the scan range for the Nth scan, the scan range for the (N+1)st scan is set based on a prediction calculation, wherein, if the direction of the lens position where the maximal focus evaluation value was obtained in the (N−1)st scan to the scan center position of the scan range for the (N−1)st scan is not the same as the direction of the lens position where the maximal focus evaluation value is obtained in the Nth scan to the scan center position of the scan range for the Nth scan, the scan range for the (N+1)st scan is not set based on the prediction calculation, and wherein, the prediction calculation is based on the lens position where the maximal focus evaluation value has been obtained in the previous scan and the lens position where the maximal focus evaluation value is obtained in the present scan.

* * * * *